(12) United States Patent
Yamazaki

(10) Patent No.: US 8,929,745 B2
(45) Date of Patent: Jan. 6, 2015

(54) OPTICAL TRANSMISSION APPARATUS

(71) Applicant: Fujitsu Optical Components Limited, Kawasaki (JP)

(72) Inventor: Toru Yamazaki, Yokohama (JP)

(73) Assignee: Fujitsu Optical Components Limited, Kawasaki (JP)

( * ) Notice: Subject to any disclaimer, the term of this patent is extended or adjusted under 35 U.S.C. 154(b) by 15 days.

(21) Appl. No.: 13/924,889

(22) Filed: Jun. 24, 2013

(65) Prior Publication Data

US 2014/0072313 A1  Mar. 13, 2014

(30) Foreign Application Priority Data

Sep. 13, 2012  (JP) .................................. 2012-202115

(51) Int. Cl.
*H04B 10/04* (2006.01)
*H04B 10/556* (2013.01)
*H04B 10/50* (2013.01)
*H04J 14/08* (2006.01)

(52) U.S. Cl.
CPC ........ *H04B 10/5561* (2013.01); *H04B 10/5053* (2013.01); *H04J 14/08* (2013.01)
USPC ........... 398/188; 398/183; 398/185; 398/198; 359/245; 359/247; 359/248

(58) Field of Classification Search
USPC ......... 398/183, 188, 185, 186, 187, 189, 192, 398/193, 194, 198, 195, 200, 201, 154, 155, 398/158, 159, 161; 359/237, 238, 245, 247, 359/248, 279
See application file for complete search history.

(56) References Cited

U.S. PATENT DOCUMENTS 7,447,443 B2 * 11/2008 Bai .............................. 398/183
8,582,980 B2 * 11/2013 Nishihara et al. ............. 398/188

FOREIGN PATENT DOCUMENTS

JP          2-167524       6/1990

* cited by examiner

*Primary Examiner* — Hanh Phan
(74) *Attorney, Agent, or Firm* — Staas & Halsey LLP

(57) ABSTRACT

A first clock modulator branches a light beam, varies a phase difference of the resulting light beams according to a first clock, and causes interference of the light beams. A second clock modulator branches a light beam from the first clock modulator and synchronized with the first clock, varies a phase difference of the resulting light beams according to a second clock, and causes interference of the light beams. A third clock modulator branches a light beam from the first clock modulator and inversely synchronized with the first clock, varies a phase difference of the resulting light beams according to a third clock, and causes interference of the light beams. The second clock and the first clock have identical cycles and differing phases. The third clock and the second clock have phases that differ by a 1/2 cycle. Four data modulators modulate the light beams from the clock modulators.

7 Claims, 23 Drawing Sheets

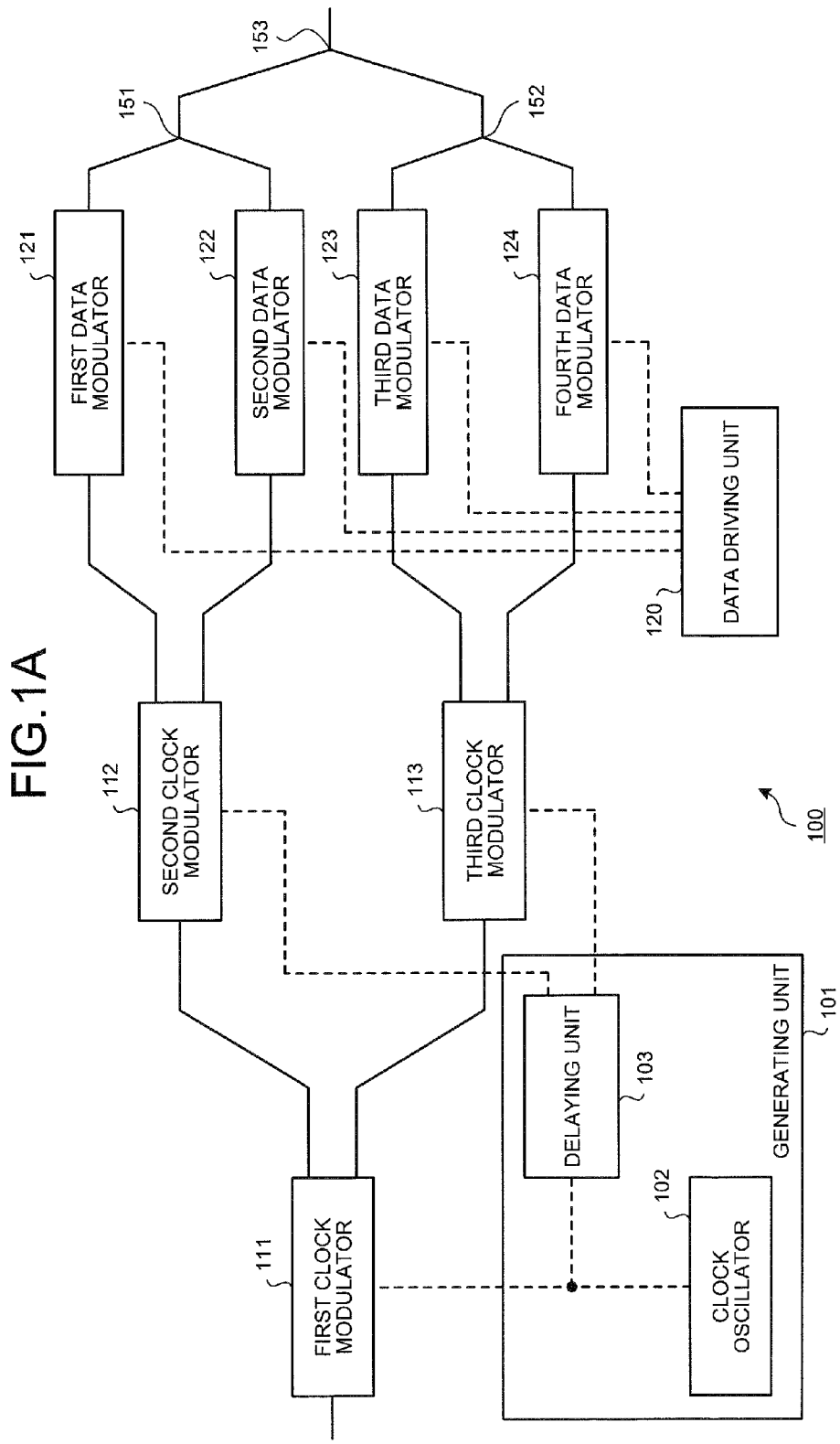

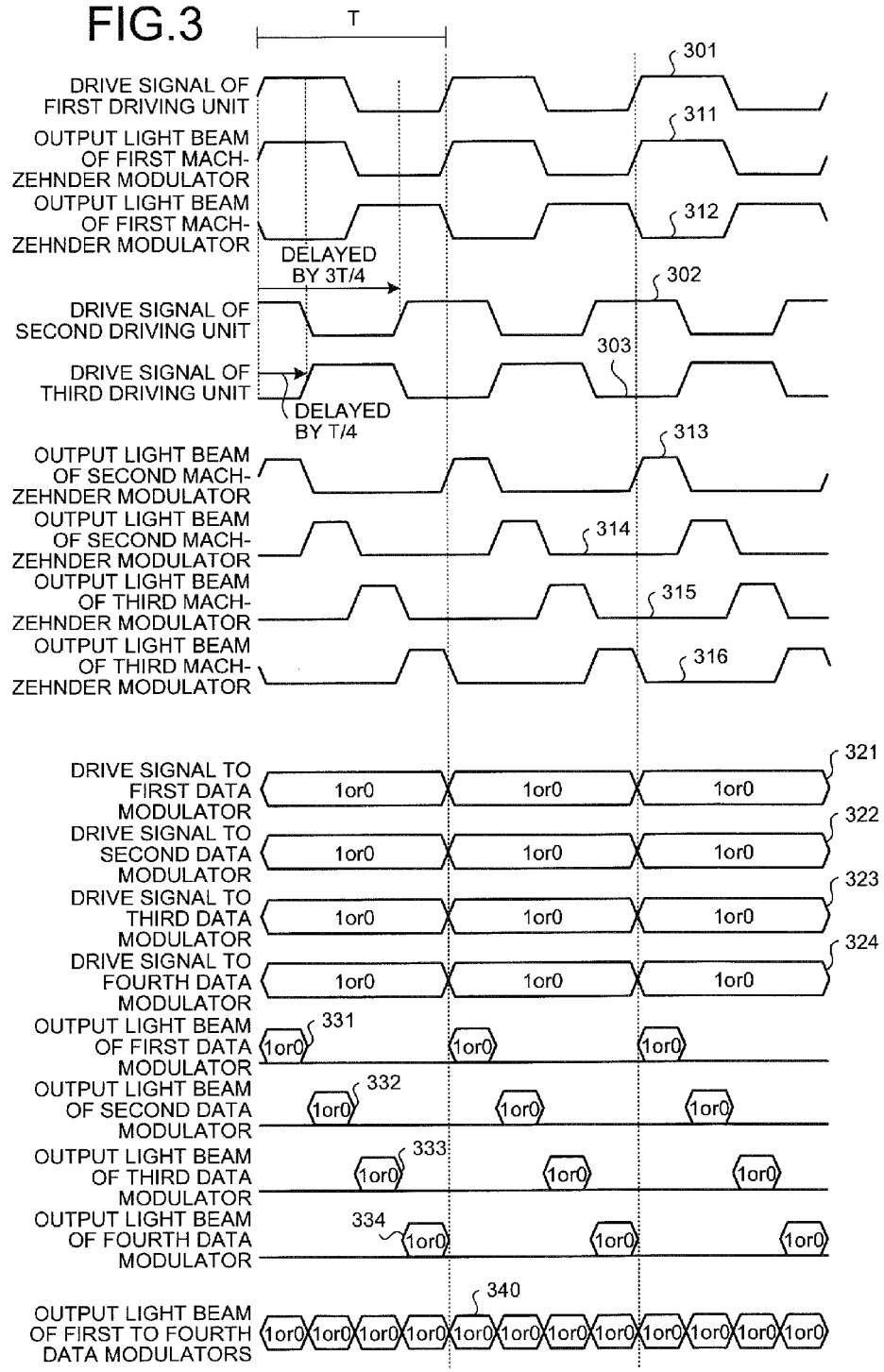

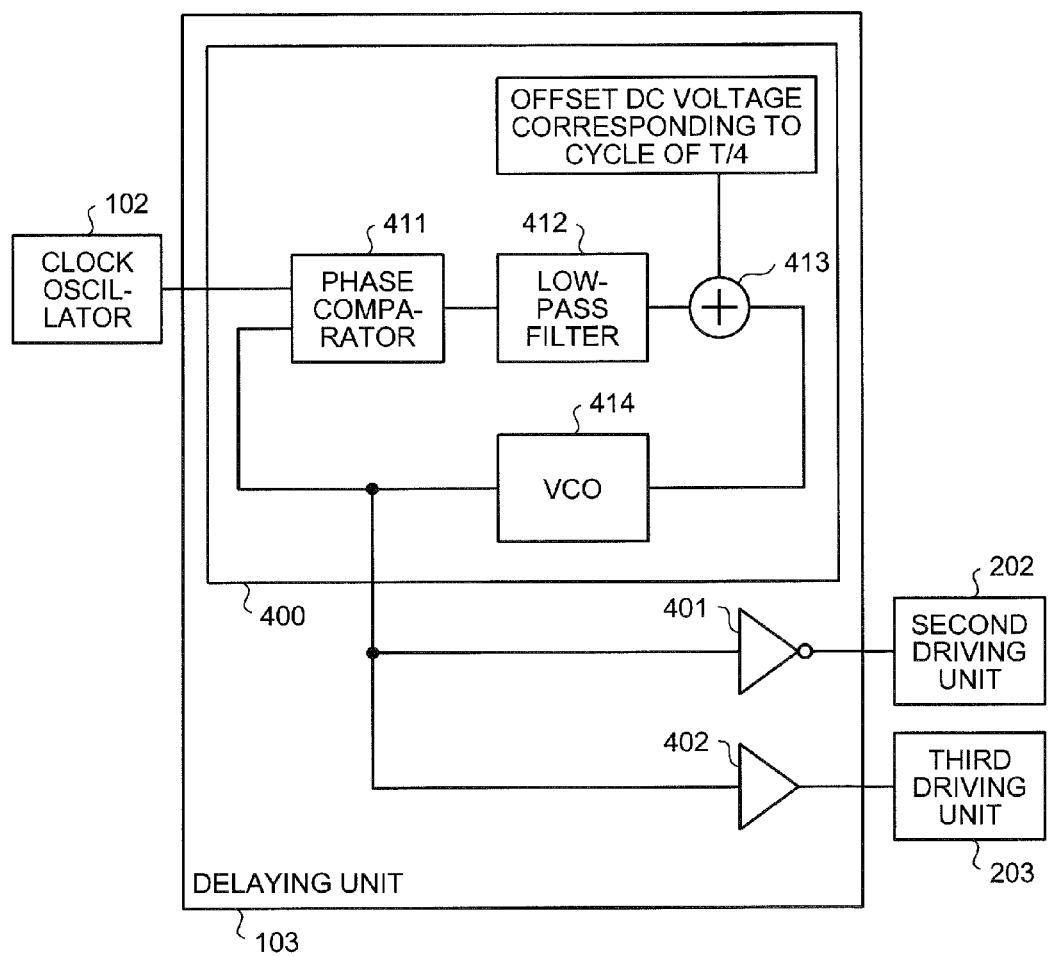

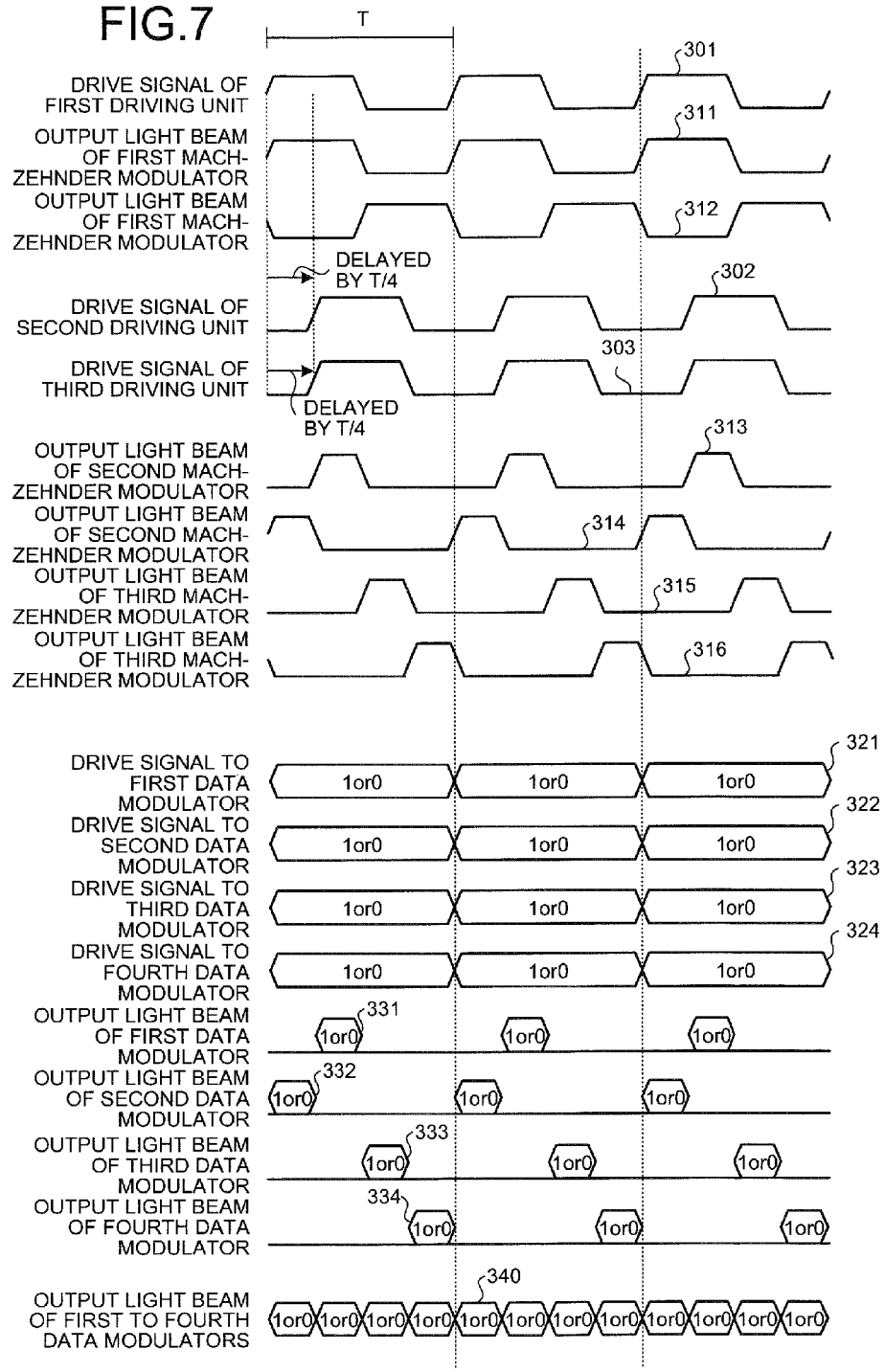

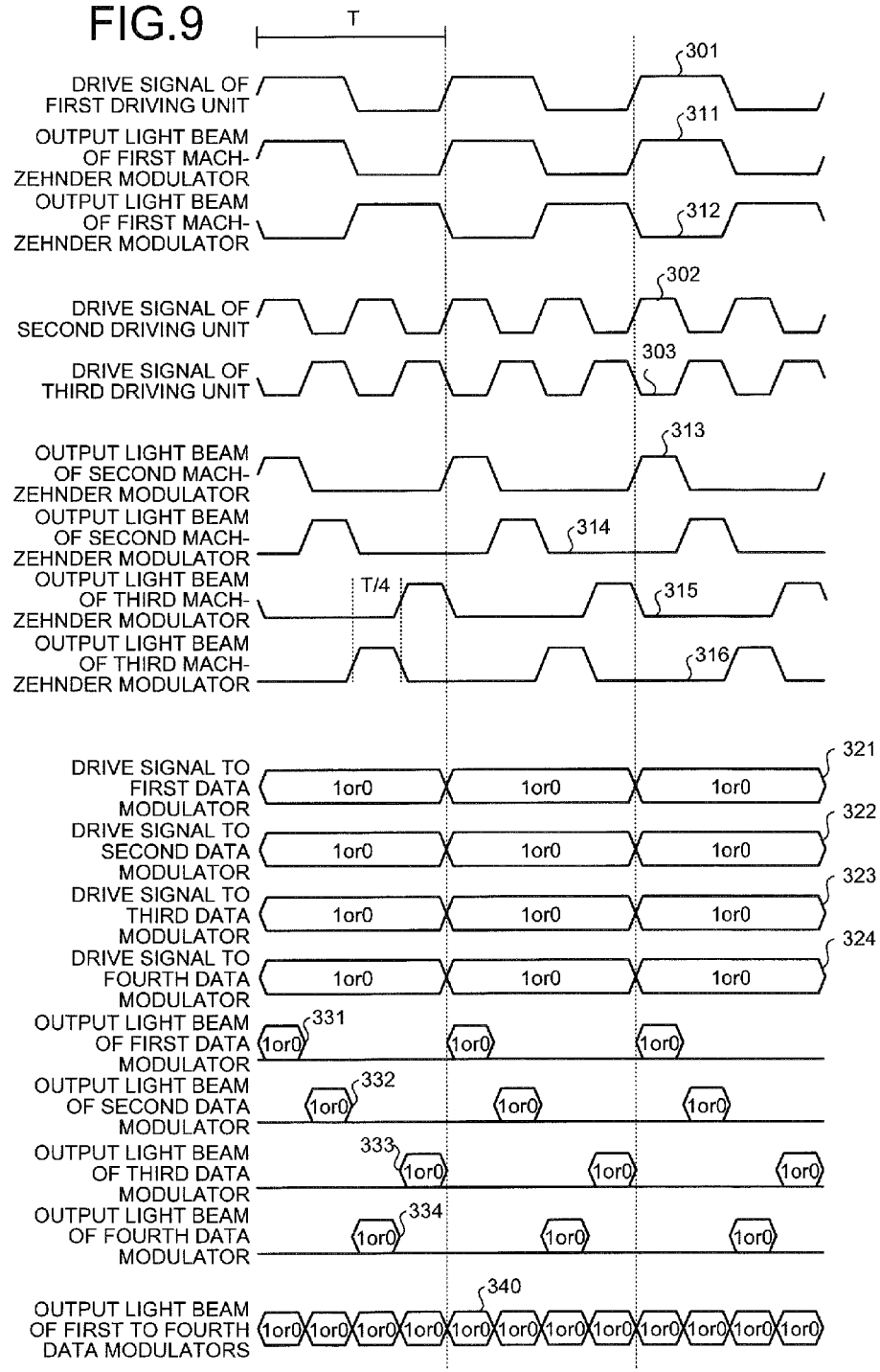

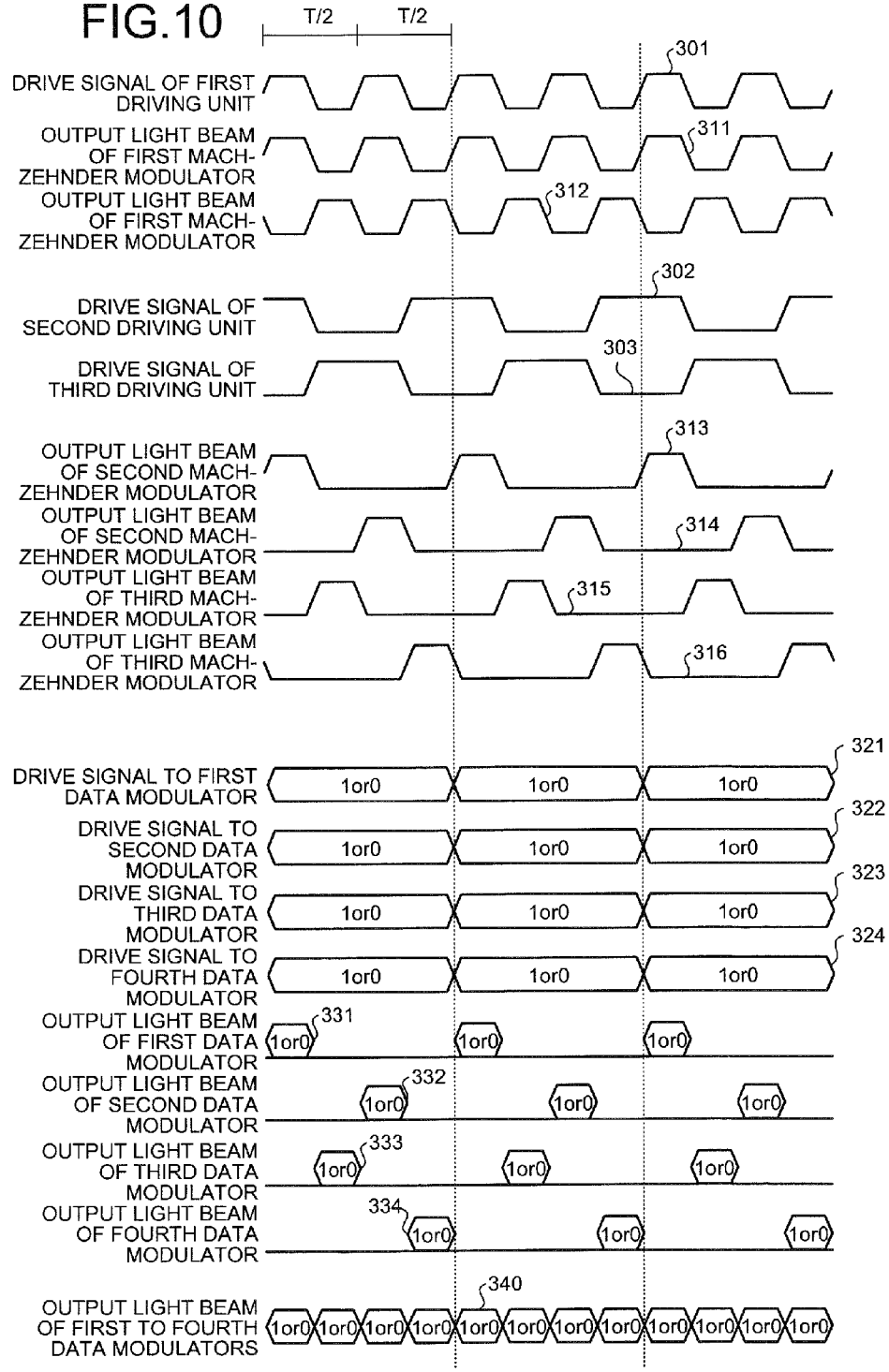

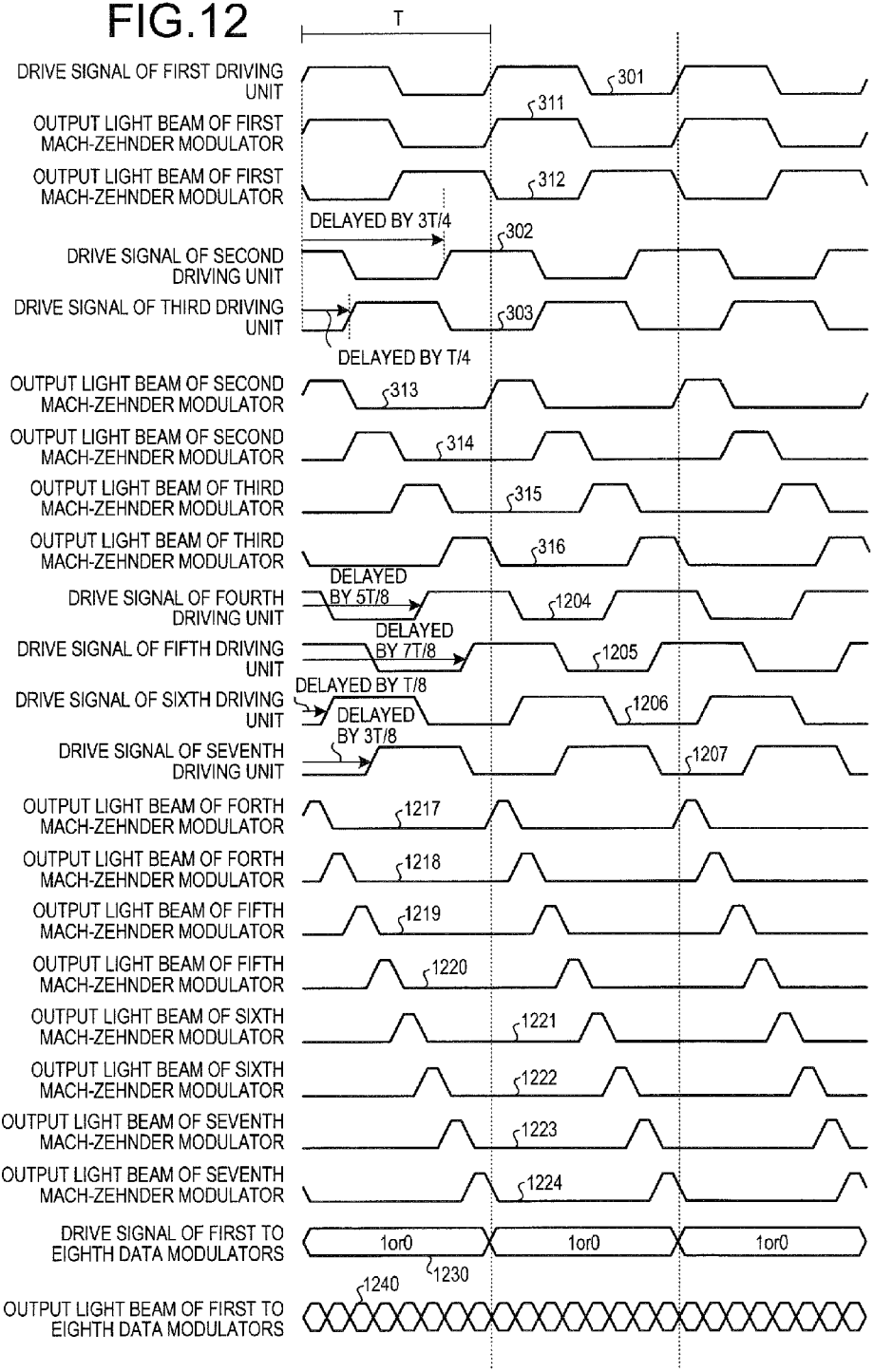

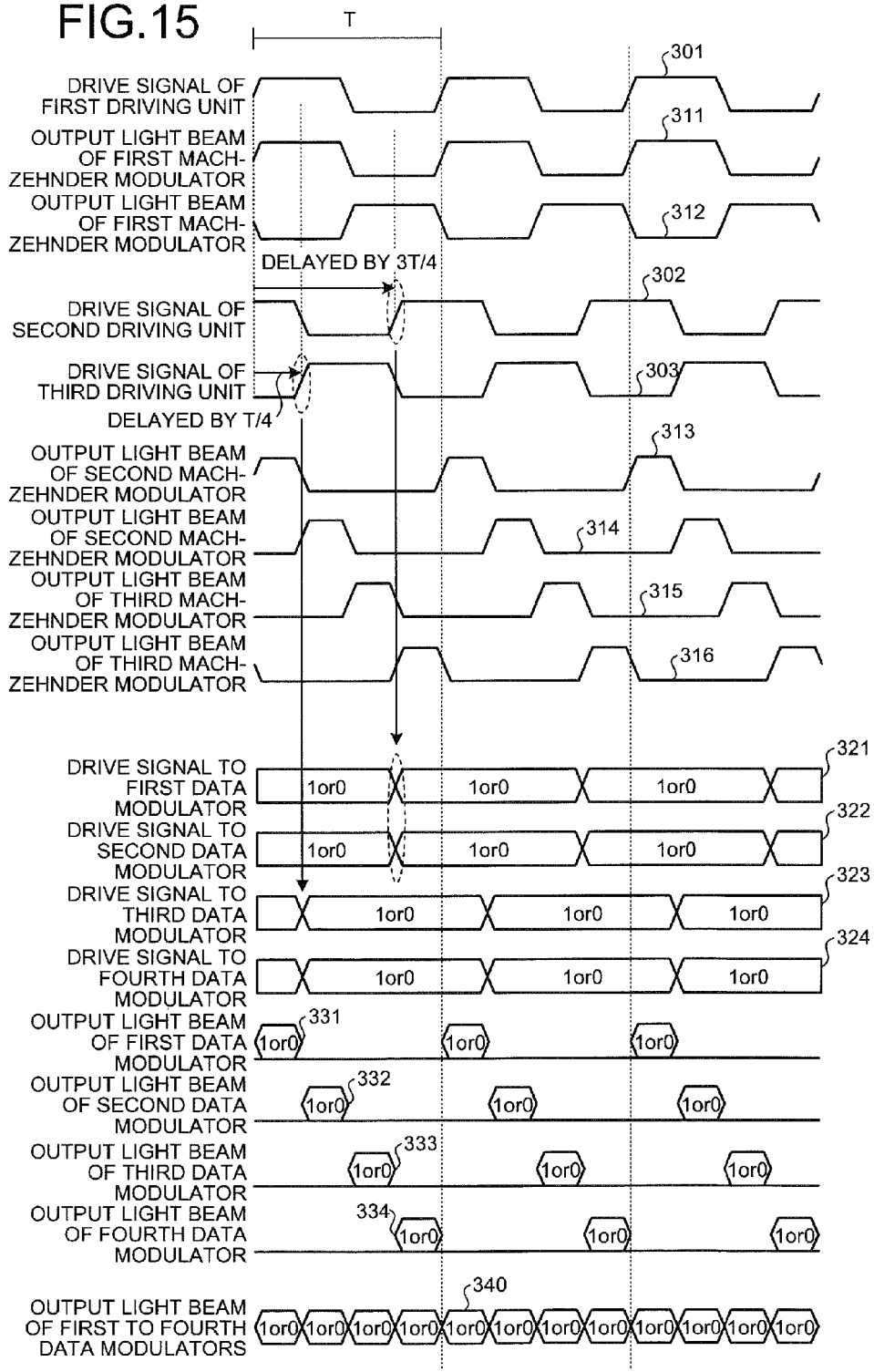

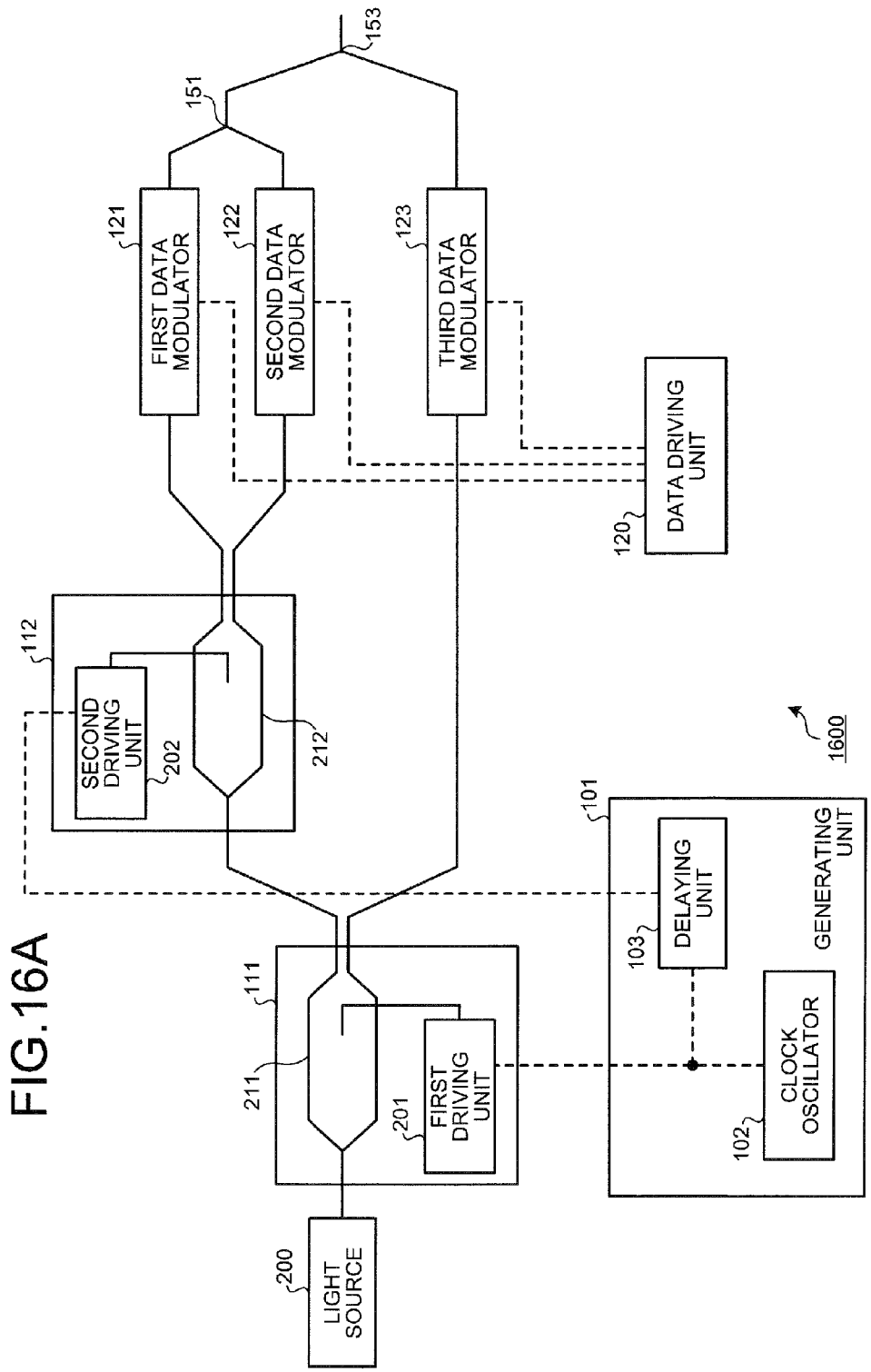

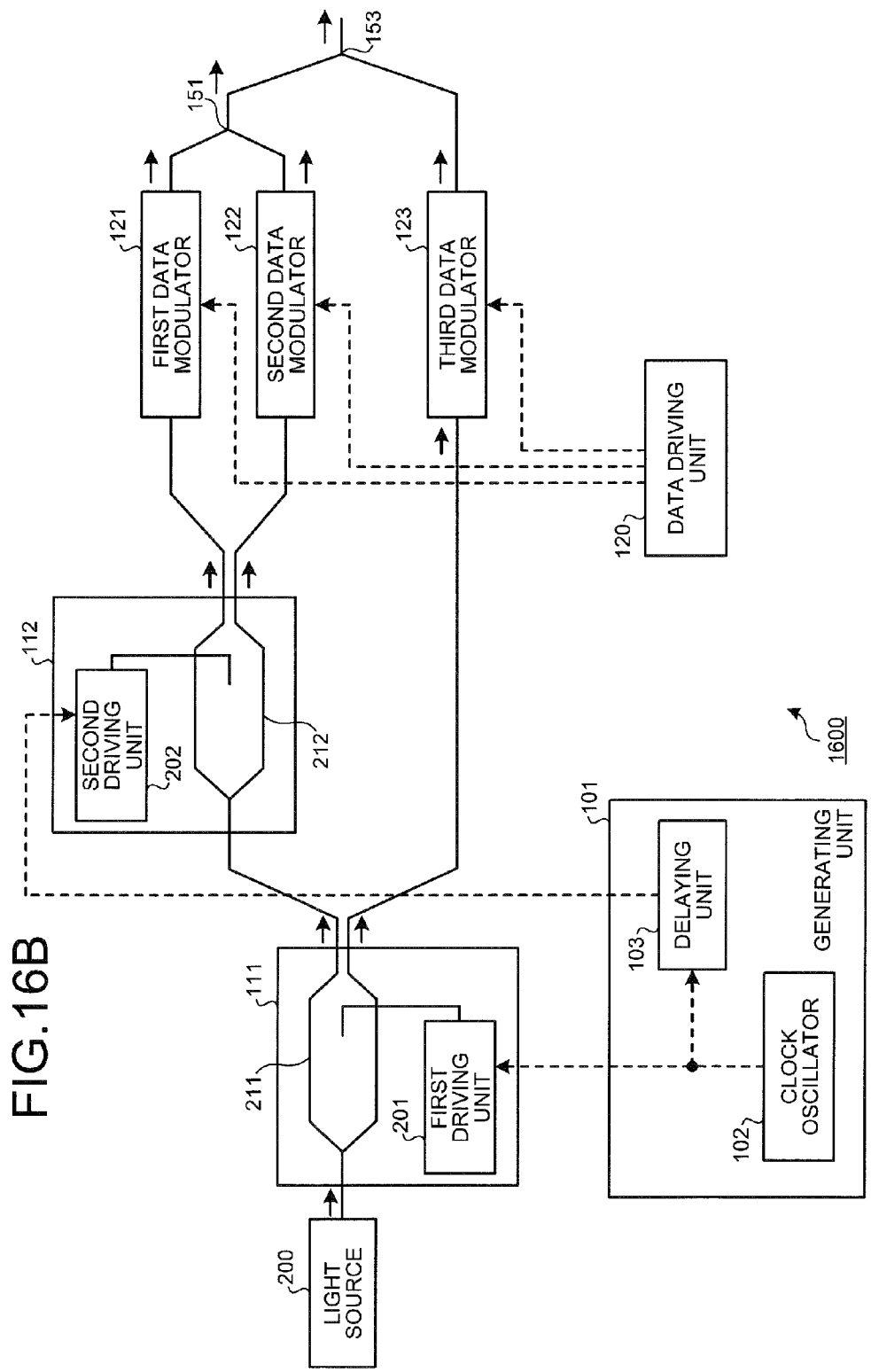

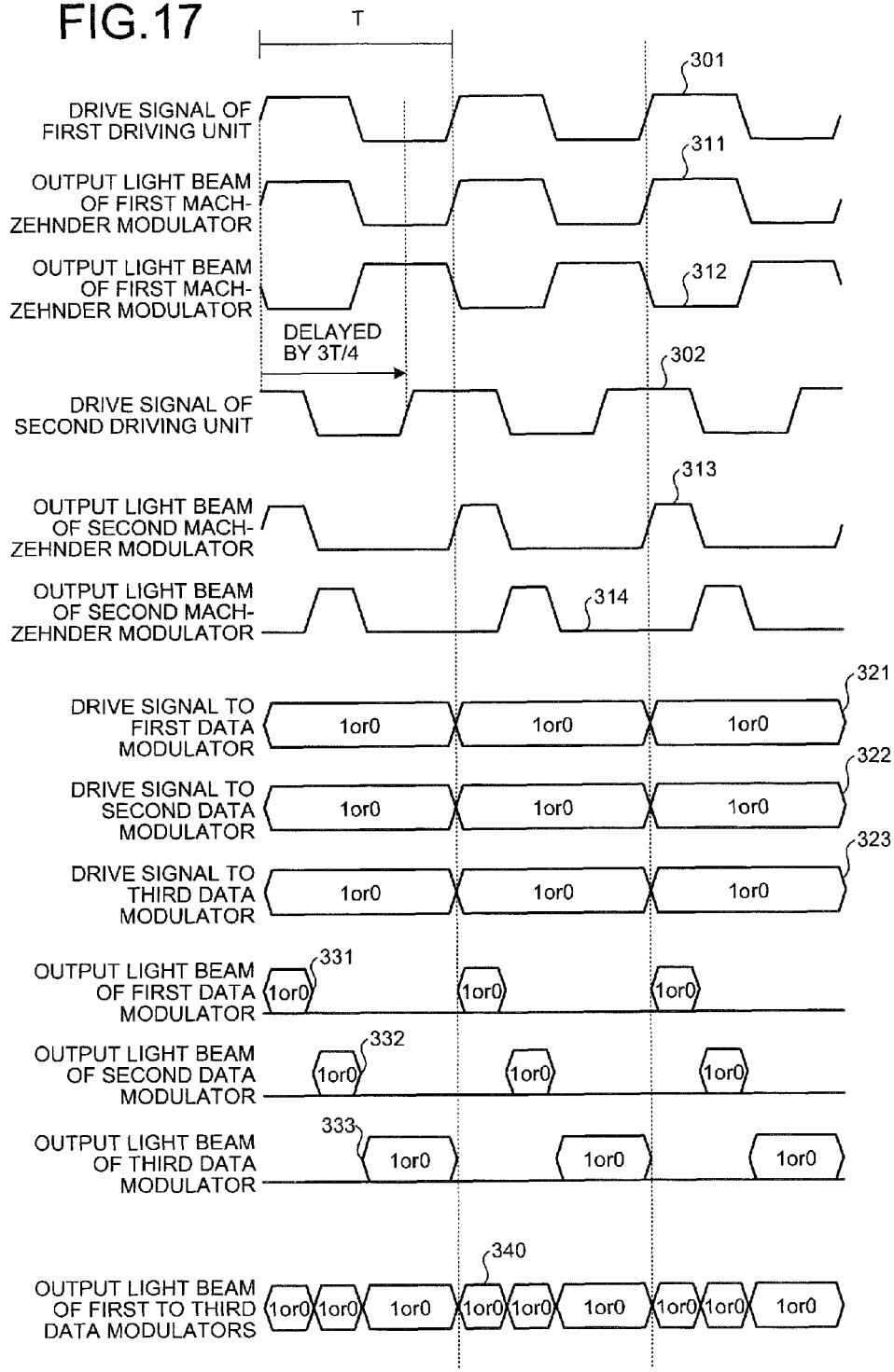

OPTICAL TRANSMISSION APPARATUS

CROSS REFERENCE TO RELATED APPLICATIONS

This application is based upon and claims the benefit of priority of the prior Japanese Patent Application No. 2012-202115, filed on Sep. 13, 2012, the entire contents of which are incorporated herein by reference.

FIELD

The embodiments discussed herein are related to an optical transmission apparatus.

BACKGROUND

Increased optical signal speed is conventionally demanded of optical transmission systems and various modulation schemes therefor are employed. One modulation scheme is, for example, differential quadrature phase shift keying (DQPSK) modulation. Dual polarization-quadrature phase shift keying (DP-QPSK) modulation and quadrature amplitude modulation (QAM) modulation can also be given as the modulation schemes.

Various multiplexing schemes to acquire multivalued optical signals are also employed such as wavelength multiplexing and polarization multiplexing. A technique of executing time-division multiplexing of optical signals is also present. For example, according to a known technique, an input light beam is divided into two clock pulses that are data-modulated and coupled, whereby dual division multiplexing is executed (see, e.g., Japanese Laid-Open Patent publication No. H2-167524).

However, according to the conventional techniques, the dual division multiplexing is the limiting factor and therefore, a problem arises in that no improvement of the transmission speed can be facilitated without the use of a high speed electronic circuit.

SUMMARY

According to an aspect of an embodiment, an optical transmission apparatus includes a generating unit that generates a first clock signal, a second clock signal of a cycle identical to that of the first clock signal and a phase different from that of the first clock signal, and a third clock signal of a phase different from that of the second clock signal by a 1/2 cycle; a first optical modulator that branches a light beam input thereto, changes a phase difference of resulting light beams according to the first clock signal, and causes interference of the light beams having the changed phase difference; a second optical modulator that branches a light beam synchronized with the first clock signal among the light beams obtained from the first optical modulator, changes a phase difference of resulting light beams according to the second clock signal, and causes interference of the light beams having the changed phase difference; a third optical modulator that branches a light beam inversely synchronized with the first clock signal among the light beams obtained from the first optical modulator, changes a phase difference of resulting light beams according to the third clock signal, and causes interference of the light beams having the changed phase difference; an optical modulating unit that executes modulation based on the light beams obtained from the second optical modulator and the third optical modulator, respectively, and a drive signal input thereto; and an optical coupler that combines optical signals obtained by the modulation executed by the optical modulating unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of an optical transmission apparatus according to a first embodiment;

FIG. 3 is a timing chart of an example of an operation of the optical transmission apparatus according to the first embodiment;

FIG. 4 is a diagram of an example of a configuration of a delaying unit for quad-division multiplexing;

FIG. 7 is a timing chart of a variation of the operation of the optical transmission apparatus according to the first embodiment;

FIG. 9 is a timing chart of an example of the operation of the optical transmission apparatus according to the second embodiment;

FIG. 10 is a timing chart of an example of the operation of the optical transmission apparatus according to a third embodiment;

FIG. 12 is a timing chart of an example of the operation of the optical transmission apparatus according to the fourth embodiment;

FIG. 15 is a timing chart of an example of the operation of an optical transmission apparatus according to a fifth embodiment;

FIG. 16A is a diagram of a configuration of the optical transmission apparatus according to a sixth embodiment;

FIG. 16B is a diagram of an example of flows of light beams and electrical signals in the optical transmission apparatus depicted in FIG. 16A; and FIG. 17 is a timing chart of an example of the operation of the optical transmission apparatus according to the sixth embodiment.

DESCRIPTION OF EMBODIMENTS

First to sixth embodiments of an optical transmission apparatus will be described in detail with reference to the accompanying drawings.

Figure 1B:
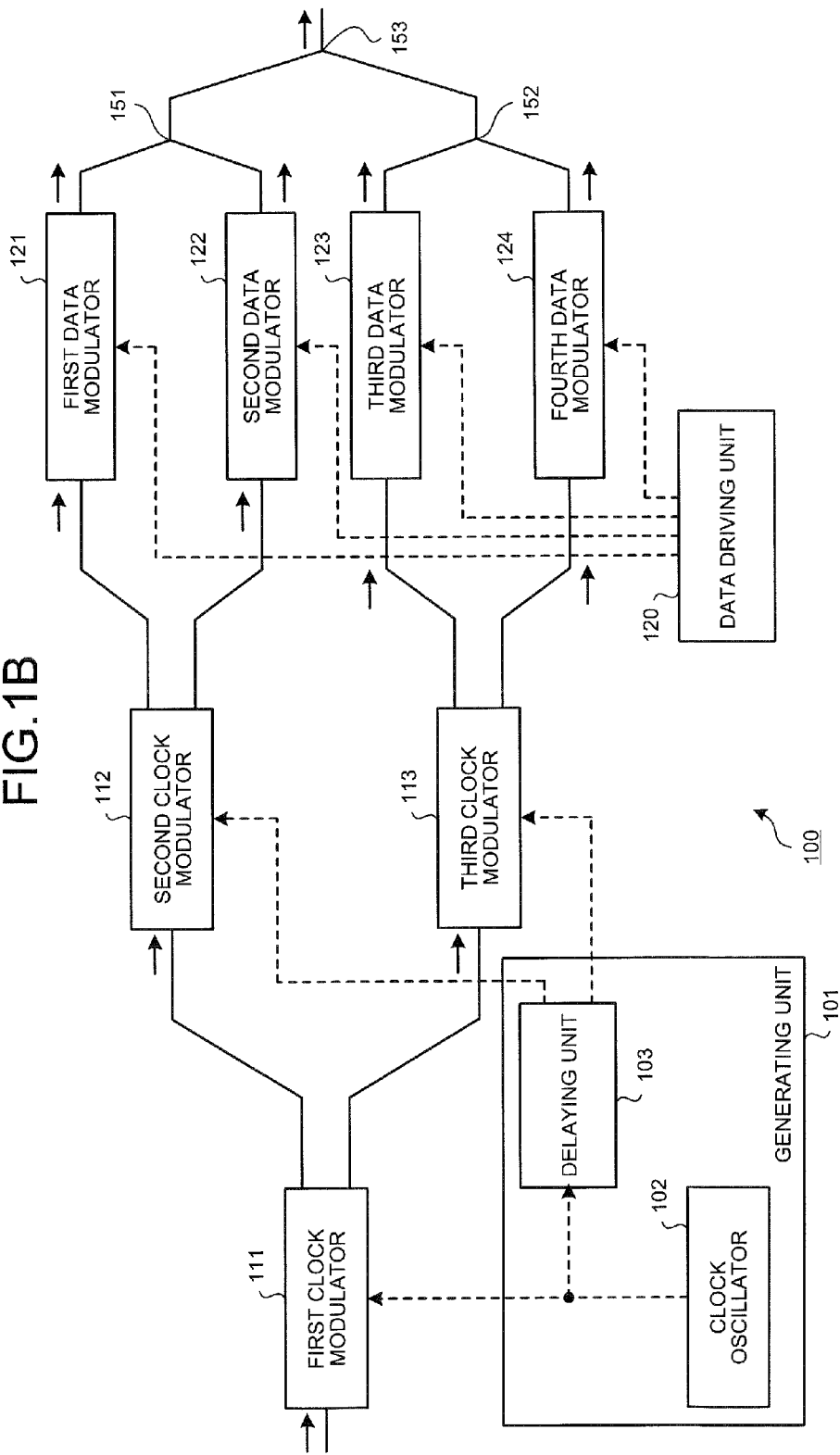
FIG. 1B is a diagram of an example of flows of light beams and electrical signals in the optical transmission apparatus depicted in FIG. 1A.

FIG. 1A is a diagram of an example of an optical transmission apparatus according to a first embodiment. FIG. 1B is a diagram of an example of flows of light beams and electrical signals in the optical transmission apparatus depicted in FIG. 1A. The optical transmission apparatus 100 depicted in FIGS. 1A and 1B is used in an optical transmission system that executes transmission of an optical signal, and transmits the optical signal that is generated using time-division multiplexing.

The optical transmission apparatus 100 includes a generating unit 101, a first clock modulator 111, a second clock modulator 112, a third clock modulator 113, a data driving unit 120, a first data modulator 121, a second data modulator 122, a third data modulator 123, a fourth data modulator 124, and optical couplers 151 to 153. The first, the second, and the third clock modulators 111 to 113 can respectively be examples of a first, a second, and a third optical modulators. The first to the fourth data modulators 121 to 124 can each be an example of an optical modulating unit.

The generating unit 101 generates a first clock signal; a second clock signal that rises or falls in the time periods during which the first clock signal rises; and a third clock signal that rises or falls in the time periods during which the first clock signal falls. The generating unit 101 outputs the generated second clock signal to the second clock modulator 112, and output the generated third clock signal to the third clock modulator 113.

For example, the generating unit 101 includes a clock oscillator 102 and a delaying unit 103. The clock oscillator 102 generates a clock signal and outputs the generated clock signal to the first clock modulator 111 and the delaying unit 103. The clock signal generated by the clock oscillator 102 is, for example, a signal that alternately repeats "High" and "Low" at a predetermined clock frequency. The clock oscillator 102 outputs the first clock signal to the first clock modulator 111 and the delaying unit 103.

The delaying unit 103 delays by a predetermined amount the first clock signal output from the clock oscillator 102, and outputs the delayed first clock signal to the second and the third clock modulators 112 and 113. For example, the delaying unit 103 outputs to the second clock modulator 112, the second clock signal that is delayed by, for example, 3/4 cycle compared to the first clock signal. Thus, the generating unit 101 can output to the second clock modulator 112, the second clock signal that rises during the time periods during which the first clock signal rises.

The delaying unit 103 outputs to the third clock modulator 113, the third clock signal that is delayed by, for example, 1/4 cycle compared to the first clock signal. The third clock signal is a signal obtained by inverting the second clock signal. Thus, the generating unit 101 can output to the second clock modulator 112, the third clock signal that falls during the time periods during which the first clock signal falls.

The first clock modulator 111 receives an input of, for example, a continuous wave (CW) laser light beam from an external light source. The first clock modulator 111 branches the CW laser light beam; controls the phase difference of each of the resulting light beams branches according to the intensity of the first clock signal that is generated by the generating unit 101; and causes the light beams whose phase differences are controlled thereby to interfere with each other. The first clock modulator 111 outputs the light beams to the second and the third clock modulators 112 and 113.

For example, the first clock modulator 111 varies the intensity ratios of the light beams to be output to the second and the third clock modulators 112 and 113, according to the first clock signal output from the clock oscillator 102. For example, when the intensity of the first clock signal output from the clock oscillator 102 is the highest, the intensity of the light beam output to the second clock modulator 112 becomes the highest; and the intensity of the light beam output to the third clock modulator 113 becomes the lowest. When the intensity of the first clock signal output from the clock oscillator 102 is the lowest, the intensity of the light beam output to the second clock modulator 112 becomes the lowest, and the intensity of the light beam output to the third clock modulator 113 becomes the highest.

The second clock modulator 112 branches a light beam that is synchronized with the first clock signal, among the light beams obtained by the interference in the first clock modulator 111; controls the phase difference of each of the resulting light beams branches according to the intensity of the second clock signal that is generated by the generating unit 101; and causes the light beam branches whose phase differences are controlled thereby to interfere with each other. The second clock modulator 112 outputs the light beam branches to the first and the second data modulators 121 and 122. For example, the second clock modulator 112 varies the intensity ratios of the light beam branches to be output to the first and the second data modulators 121 and 122, according to the second clock signal output from the delaying unit 103.

For example, the second clock modulator 112 varies the intensity ratios of the light beam branches to be output to the first and the second data modulators 121 and 122, according to the second clock signal. For example, when the intensity of the second clock signal output from the clock oscillator 102 is the highest, the intensity of the light beam branch output to the first data modulator 121 becomes the highest; and the intensity of the light beam branch output to the second data modulator 122 becomes the lowest. When the intensity of the second clock signal output from the clock oscillator 102 is the lowest, the intensity of the light beam output to the first data modulator 121 becomes the lowest and the intensity of the light beam output to the second data modulator 122 becomes the highest.

The third clock modulator 113 controls according to the intensity of the third clock signal that is generated by the generating unit 101, the phase difference of the light beams obtained by branching the light beam that is inversely synchronized with the first clock signal and among the light beams obtained by the interference in the first clock modulator 111 and causes the light beams whose phase differences are controlled thereby, to interfere with each other. The third clock modulator 113 outputs the branched light beams to the third and the fourth data modulators 123 and 124.

For example, according to the third clock signal output from the delaying unit 103, the third clock modulator 113 varies the intensity ratios of the light beams to be output to the third and the fourth data modulators 123 and 124. For example, the third clock modulator 113 is input with the third clock signal that is obtained by inverting the second clock signal.

When the intensity of the third clock signal output from the clock oscillator 102 is the highest, the intensity of the light beam output to the third data modulator 123 becomes the highest, and the intensity of the light beam output to the fourth data modulator 124 becomes the lowest. When the intensity of the third clock signal output from the clock oscillator 102 is the lowest, the intensity of the light beam output to the third data modulator 123 becomes the lowest, and the intensity of the light beam output to the fourth data modulator 124 becomes the highest.

In this manner, in the optical transmission apparatus 100, the second and the third clock modulators 112 and 113 are disposed downstream from the first clock modulator 111. The first clock signal is used for the first clock modulator 111 upstream. The second clock signal that rises or falls in the time periods during which the first clock signal rises is used for the second clock modulator 112 downstream. The third clock signal that rises or falls in the time periods during which the first clock signal falls is used for the third clock modulator 113 downstream.

Thus, in the time period for the rising of each of the optical clock pulses input into the second and the third clock modulators 112 and 113 downstream, the condition of the interference is switched in the second and the third clock modulators 112 and 113 downstream. Therefore, the optical clock pulses input into the second and the third clock modulators 112 and 113 downstream can each be divided into two optical clock pulses, whereby, four optical clock pulses can be acquired whose timings differ from each other.

The data driving unit 120 generates drive signals for the first to the fourth data modulators 121 to 124 each based on the data signal input, and outputs the generated drive signals to the first to the fourth data modulators 121 to 124. For example, the data driving unit 120 adjusts the timing of output of the drive signals to the first to the fourth data modulators 121 to 124 by using the clock signal output from the clock oscillator 102.

The first to the fourth data modulators 121 to 124 are examples of an optical modulating unit that executes modulation based on the light beams acquired as the result of the interference in the second clock modulator 112, the light beams acquired as the result of the interference in the third clock modulator 113, and the input drive signal.

For example, the first data modulator 121 modulates the light beam output from the second clock modulator 112 using the drive signal output from the data driving unit 120 and outputs the optical signal obtained by the modulation to the optical coupler 151. The second data modulator 122 modulates the light beam output from the second clock modulator 112 using the drive signal output from the data driving unit 120 and outputs the optical signal obtained by the modulation to the optical coupler 151.

The third data modulator 123 modulates the light beam output from the third clock modulator 113 using the drive signal output from the data driving unit 120 and outputs the optical signal obtained by the modulation to the optical coupler 152. The fourth data modulator 124 modulates the light beam output from the third clock modulator 113 using the drive signal output from the data driving unit 120 and outputs the optical signal obtained by the modulation to the optical coupler 152.

Any one of various kinds of modulator enabling the modulation scheme demanded for the transmission system is useable as each of the first to the fourth data modulators 121 to 124. For example, any one of such modulators is usable as each of the first to the fourth data modulators 121 to 124 as an external amplitude (EA) modulator, a differential quadrature phase shift keying (DQPSK) modulator, a quadrature amplitude modulation (QAM) modulator, a dual polarization-quadrature phase shift keying (DP-QPSK) modulator, and a dual polarization-quadrature amplitude modulation (DP-QAM) modulator.

The optical couplers 151 to 153 are optical couplers that combine the optical signals obtained by the first to the fourth data modulators 121 to 124. For example, the optical coupler 151 combines the optical signals output from the first and the second data modulators 121 and 122, and outputs the resulting optical signal to the optical coupler 153. The optical coupler 152 combines the optical signals output from the third and the fourth data modulators 123 and 124, and outputs the resulting optical signal to the optical coupler 153. The optical coupler 153 combines the optical signals output from the optical couplers 151 and 152 with each other, and outputs the resulting optical signal.

As described, according to the optical transmission apparatus 100, the optical clock pulses input into the second and the third clock modulators 112 and 113 can each be further divided into the two optical clock pulses, whereby, the four optical clock pulses can be acquired whose timings differ from each other. The four optical clock pulses are each modulated using the drive signal and are combined, whereby, a quad-division multiplexed optical signal can be acquired.

Figure 2A:
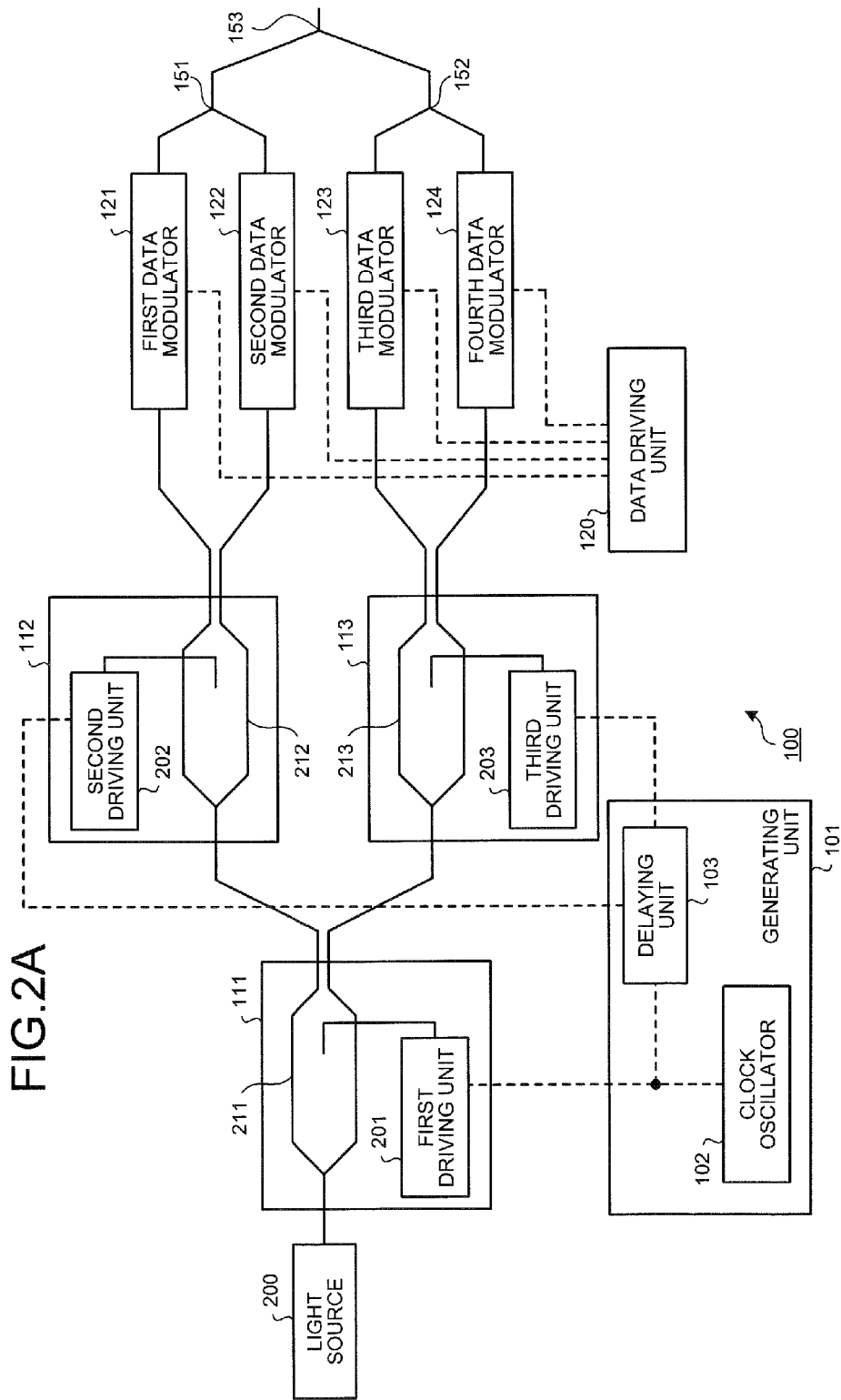
FIG. 2A is a diagram of a configuration of the optical transmission apparatus according to the first embodiment.
Figure 2B:
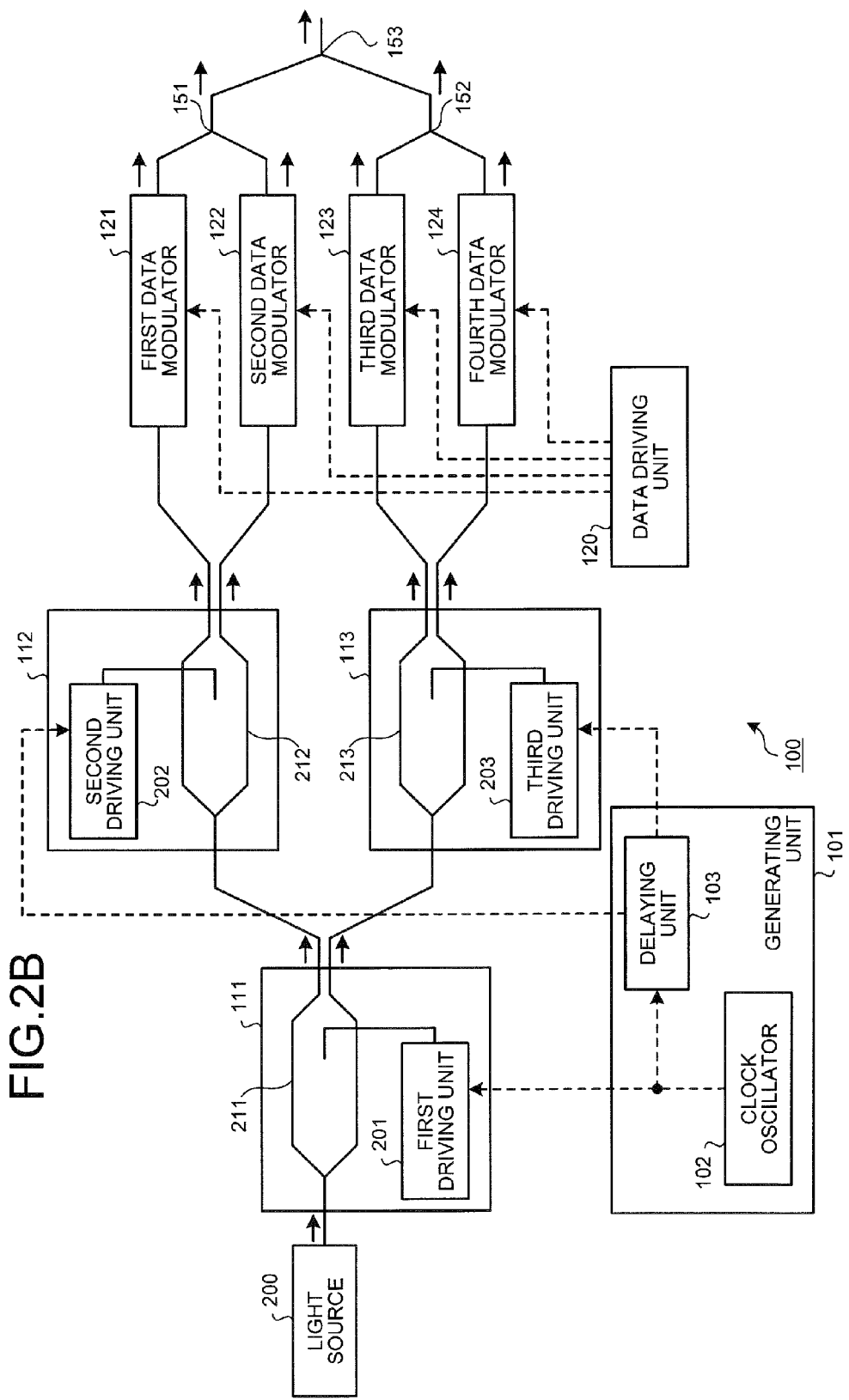
FIG. 2B is a diagram of an example of flows of light beams and electrical signals in the optical transmission apparatus depicted in FIG. 2A.

FIG. 2A is a diagram of a configuration of the optical transmission apparatus according to the first embodiment. FIG. 2B is a diagram of an example of flows of light beams and electrical signals in the optical transmission apparatus depicted in FIG. 2A. In FIGS. 2A and 2B, the components identical to those depicted in FIGS. 1A and 1B will be given the same reference numerals used in FIGS. 1A and 1B, and will not again be described.

As depicted in FIGS. 2A and 2B, the optical transmission apparatus 100 may include a light source 200 in addition to the configurations depicted in FIGS. 1A and 1B. The light source 200 generates a CW laser light beam and outputs the generated light beam to the first clock modulator 111.

The first clock modulator 111 includes a first driving unit 201 and a first Mach-Zehnder modulator 211. The first driving unit 201 applies to an electrode of the first Mach-Zehnder modulator 211, a drive signal that corresponds to the first clock signal output from the clock oscillator 102. For example, the first driving unit 201 outputs a binary signal representing a predetermined clock frequency to the electrode of the first Mach-Zehnder modulator 211.

For example, when the first clock signal output from the clock oscillator 102 is "High", a highest voltage is applied to the electrode of the first Mach-Zehnder modulator 211 and when the first clock signal output therefrom is "Low", a lowest voltage is applied to the electrode of the first Mach-Zehnder modulator 211.

The first Mach-Zehnder modulator 211 branches the CW laser light beam output from the light source 200, causes the branched light beams to interfere with each other, and outputs one of the light beams obtained by the interference to the second clock modulator 112 and the other thereof to the third clock modulator 113. The first Mach-Zehnder modulator 211 also varies the phase difference of each of the resulting light beams according to the voltage applied thereto by the first driving unit 201.

Thus, the intensity ratios of the light beams to be output to the second and the third clock modulators 112 and 113 are varied according to the voltage applied thereto by the first driving unit 201. The light beams output from the first Mach-Zehnder modulator 211 are a pair of light beams whose intensities are inverted with respect each other.

For example, when the first clock signal output from the clock oscillator 102 is "High", the voltage applied to the electrode of the first Mach-Zehnder modulator 211 becomes the highest. When the voltage becomes the highest that is applied to the electrode of the first Mach-Zehnder modulator 211, for example, the intensity of the light beam output to the second clock modulator 112 becomes the highest and the intensity of the light beam output to the third clock modulator 113 becomes the lowest.

When the first clock signal output from the clock oscillator 102 is "Low", the voltage applied to the electrode of the first Mach-Zehnder modulator 211 becomes the lowest. When the voltage becomes the lowest that is applied to the electrode of the first Mach-Zehnder modulator 211, for example, the intensity of the light beam output to the second clock modulator 112 becomes the lowest and the intensity of the light beam output to the third clock modulator 113 becomes the highest.

The second clock modulator 112 includes a second driving unit 202 and a second Mach-Zehnder modulator 212. The second driving unit 202 applies to the electrode of the second Mach-Zehnder modulator 212, a drive signal that corresponds to the second clock signal output from the delaying unit 103. For example, the second driving unit 202 outputs a binary signal representing a predetermined clock frequency to the electrode of the second Mach-Zehnder modulator 211 at a timing delayed by a predetermined amount by the delaying unit 103.

For example, when the second clock signal output from the delaying unit 103 is "High", a highest voltage is applied to the electrode of the second Mach-Zehnder modulator 212 and when the second clock signal output therefrom is "Low", a lowest voltage is applied to the electrode of the second Mach-Zehnder modulator 212.

The second Mach-Zehnder modulator 212 branches the light beam output from the first Mach-Zehnder modulator 211, causes the resulting light beams to interfere with each other, and outputs one of the light beams obtained by the interference to the first data modulator 121 and the other thereof to the second data modulator 122. The second Mach-Zehnder modulator 212 also varies the phase difference of each of the light beams according to the voltage applied thereto by the second driving unit 202.

Thus, the intensity ratios of the light beams output to the first and the second data modulators 121 and 122 are varied according to the voltage applied thereto by the second driving unit 202. The light beams output from the second Mach-Zehnder modulator 212 are a pair of light beams whose intensities are inverted with respect to each other.

For example, when the second clock signal output from the delaying unit 103 is "High", the voltage applied to the electrode of the second Mach-Zehnder modulator 212 becomes the highest. When the voltage becomes the highest that is applied to the electrode of the second Mach-Zehnder modulator 212, the intensity of the light beam output to the first data modulator 121 becomes the highest and the intensity of the light beam output to the second data modulator 122 becomes the lowest.

When the second clock signal output from the delaying unit 103 is "Low", the voltage applied to the electrode of the second Mach-Zehnder modulator 212 becomes the lowest. When the voltage becomes the lowest that is applied to the electrode of the second Mach-Zehnder modulator 212, the intensity of the light beam output to the first data modulator 121 becomes the lowest and the intensity of the light beam output to the second data modulator 122 becomes the highest.

The third clock modulator 113 includes a third driving unit 203 and a third Mach-Zehnder modulator 213. The third driving unit 203 applies to an electrode of the third Mach-Zehnder modulator 213, a drive signal that corresponds to the third clock signal output from the delaying unit 103. For example, the third driving unit 203 outputs a binary signal representing a predetermined clock frequency to the electrode of the third Mach-Zehnder modulator 213 at a timing delayed by a predetermined amount by the delaying unit 103.

For example, when the third clock signal output from the delaying unit 103 is "High", a highest voltage is applied to the electrode of the third Mach-Zehnder modulator 213 and when the third clock signal output therefrom is "Low", a lowest voltage is applied to the electrode of the third Mach-Zehnder modulator 213.

The third Mach-Zehnder modulator 213 branches the light beam output from the first Mach-Zehnder modulator 211, causes the resulting light beams to interfere with each other, and outputs one of the light beams obtained by the interference to the third data modulator 123 and the other thereof to the fourth data modulator 124. The third Mach-Zehnder modulator 213 also varies the phase difference of each of the light beams according to the voltage applied thereto by the third driving unit 203.

Thus, the intensity ratios of the light beams output to the third and the fourth data modulators 123 and 124 are varied according to the voltage applied thereto by the third driving unit 203. The light beams output from the third Mach-Zehnder modulator 213 are a pair of light beams whose intensities are inverted with respect each other.

For example, when the third clock signal output from the delaying unit 103 is "High", the voltage applied to the electrode of the third Mach-Zehnder modulator 213 becomes the highest. When the voltage becomes the highest that is applied to the electrode of the third Mach-Zehnder modulator 213, the intensity of the light beam output to the third data modulator 123 becomes the highest and the intensity of the light beam output to the fourth data modulator 124 becomes the lowest.

When the third clock signal output from the delaying unit 103 is "Low", the voltage applied to the electrode of the third Mach-Zehnder modulator 213 becomes the lowest. When the voltage becomes the lowest that is applied to the electrode of the third Mach-Zehnder modulator 213, the intensity of the light beam output to the third data modulator 123 becomes the lowest and the intensity of the light beam output to the fourth data modulator 124 becomes the highest.

FIG. 3 is a timing chart of an example of an operation of the optical transmission apparatus according to the first embodiment. A drive signal 301 is a drive signal that is output from the first driving unit 201 to the first Mach-Zehnder modulator 211 according to the first clock signal output from the clock oscillator 102. The drive signal 301 is a signal that alternately repeats "High" and "Low" at the cycle of T.

Output light beams 311 and 312 respectively are light beams output by the first Mach-Zehnder modulator 211 to the second and the third clock modulators 112 and 113 according to the drive signal 301. The output light beam 311 is a light beam that is synchronized with the drive signal 301. The output light beam 312 is a light beam whose intensity is inverted with respect to that of the output beam 311.

A drive signal 302 represents a drive signal that is output from the second driving unit 202 to the second Mach-Zehnder modulator 212, and is a signal that alternately repeats "High" and "Low" at the cycle of T. The second clock signal input into the second driving unit 202 is delayed by 3T/4 of the cycle, by the delaying unit 103. Therefore, the drive signal 302 is delayed by 3T/4 as the cycle compared to the drive signal 301 of the first driving unit 201.

A drive signal 303 represents a drive signal that is output from the third driving unit 203 to the third Mach-Zehnder modulator 213, and is a signal that alternately repeats "High" and "Low" at the cycle of T. The third clock signal input into the third driving unit 203 is delayed by T/4 of the cycle, by the delaying unit 103. Therefore, the drive signal 303 is delayed by T/4 as the cycle compared to the drive signal 301 of the first driving unit 201.

An output light beam 313 is a light beam output by the second Mach-Zehnder modulator 212 to the first data modulator 121 according to the drive signal 302, and becomes "High" only during the time periods during which both of the output light beam 311 and the drive signal 302 are "High". An output light beam 314 is a light beam output by the second Mach-Zehnder modulator 212 to the second data modulator 122 according to the drive signal 302, and becomes "High" only during the time periods during which the output light beam 311 is "High" and the drive signal 302 is "Low".

An output light beam 315 is a light beam output by the third Mach-Zehnder modulator 213 to the third data modulator 123 according to the drive signal 303, and becomes "High" only during the time periods during which both of the output light beam 312 and the drive signal 303 are "High". An output light beam 316 is a light beam output by the third Mach-Zehnder modulator 213 to the fourth data modulator 124 according to the drive signal 303, and becomes "High" only during the time periods during which the output light beam 312 is "High" and the drive signal 303 is "Low".

Thus, the output light beams 313 to 316 are light beams whose High time periods are shifted by T/4 relative to one another.

The drive signals 321 to 324 represent the drive signals that are respectively output from the data driving unit 120 to the first to the fourth data modulators 121 to 124, and each take a value of "1" or "0" according to the data signal input into the data driving unit 120.

An output light beam 331 is a light beam that is output by the first data modulator 121 to the optical coupler 151 according to the drive signal 321. For example, the output light beam 331 is a light beam that is obtained by modulating each "High" portion of the output light beam 313 using the value of "1" or "0" of the drive signal 321. An output light beam 332 is a light beam that is output by the second data modulator 122 to the optical coupler 151 according to the drive signal 322. For example, the output light beam 332 is a light beam that is obtained by modulating each "High" portion of the output light beam 314 using the value of "1" or "0" of the drive signal 322.

An output light beam 333 is a light beam that is output by the third data modulator 123 to the optical coupler 152 according to the drive signal 323. For example, the output light beam 333 is a light beam that is obtained by modulating each "High" portion of the output light beam 315 using the value of "1" or "0" of the drive signal 323. An output light beam 334 is a light beam that is output by the fourth data modulator 124 to the optical coupler 152 according to the drive signal 324. For example, the output light beam 334 is a light beam that is obtained by modulating each "High" portion of the output light beam 324 using the value of "1" or "0" of the drive signal 324.

An output light beam 340 is a light beam that is output from the optical coupler 153 and is a light beam obtained by combining the output light beams 331 to 334. The "High" time periods of the output light beams 331 to 334 are shifted by T/4 relative to one another and therefore, combining the output light beams 331 to 334 enables generation of a quad-division multiplexed optical signal whose cycle is T/4.

The execution of the modulation for each of the output light beams 313 to 316 enables acquisition of the output light beam 340 whose value is switched at the cycles of T/4 even when the cycle of each of the drive signals 321 to 324 is T. Therefore, for example, the operation cycle of each of the data driving unit 120 and of the first to the fourth data modulators 121 to 124 can be set to be T/4. Therefore, for example, a high speed optical signal based on the quad-division multiplexing can be generated even without using any high speed circuit in the data driving unit 120 and the first to the fourth data modulators 121 to 124.

FIG. 4 is a diagram of an example of the configuration of the delaying unit for the quad-division multiplexing. As depicted in FIG. 4, the delaying unit 103 depicted in FIGS. 1A and 2B includes a phase locked loop (PLL) circuit 400, an inverting output buffer 401, and an output buffer 402. The clock signal output from the clock oscillator 102 to the delaying unit 103 is input into the PLL circuit 400.

The PLL circuit 400 includes a phase comparator 411, a low-pass filter 412, an adder 413, and a voltage controlled oscillator (VCO) 414. The phase comparator 411 compares the phase of the clock signal output from the clock oscillator 102 with that of a clock signal output from the VCO 414, and outputs a signal indicating the result of the phase comparison to the low-pass filter 412.

The low-pass filter 412 allows only the frequency components equal to or lower than a predetermined frequency of the signal output from the phase comparator 411 to pass, and outputs the frequency components to the adder 413. The adder 413 adds the signal output from the low-pass filter 412 and an offset DC voltage corresponding to a cycle of T/4, and outputs a signal indicating the result of the addition to the VCO 414.

The VCO 414 generates a clock signal based on the frequency of the signal output from the adder 413, and outputs the generated clock signal to the phase comparator 411, the inverting output buffer 401, and the output buffer 402. Thus, the clock signal obtained by delaying the clock signal input into the delaying unit 103 by the cycle of T/4 can be output to the inverting output buffer 401 and the output buffer 402.

The inverting output buffer 401 inverts the clock signal output from the PLL circuit 400 and outputs the inverted signal to the second driving unit 202. Thus, the clock signal obtained by delaying the clock signal input into the delaying unit 103 by the cycle of 3T/4 (the second clock signal) can be output to the second driving unit 202.

The output buffer 402 outputs to the third driving unit 203, the clock signal output from the PLL circuit 400. Thus, the clock signal obtained by delaying the clock signal input into the delaying unit 103 by the cycle of T/4 (the third clock signal) can be output to the third driving unit 203.

Figure 5:
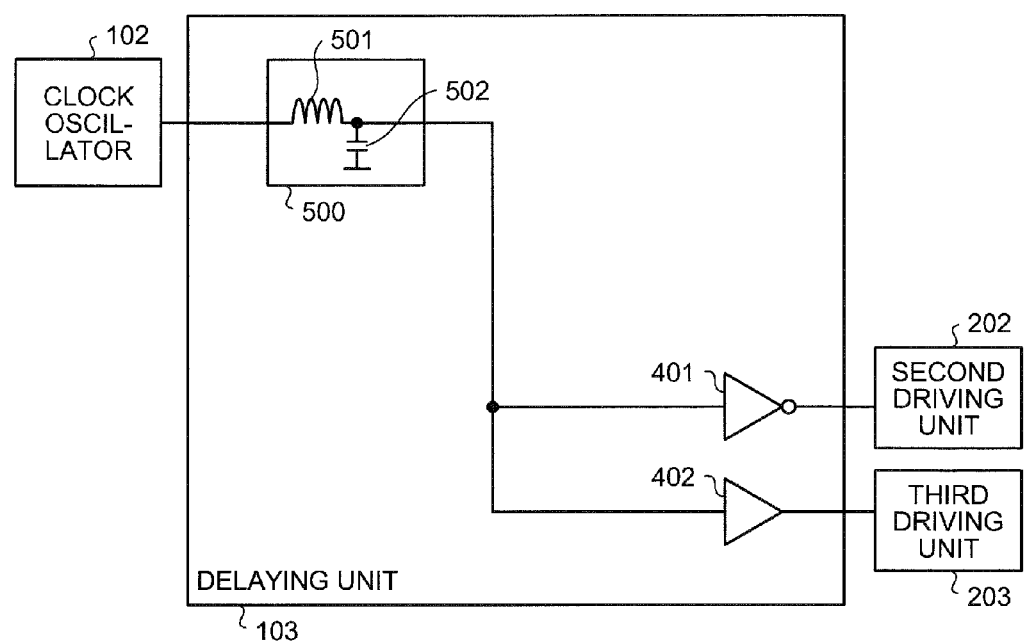
FIG. 5 is a diagram of another example of a configuration of the delaying unit for the quad-division multiplexing.

FIG. 5 is a diagram of another example of the configuration of the delaying unit for the quad-division multiplexing. In FIG. 5, components identical to those depicted in FIG. 4 will be given the same reference numerals used in FIG. 4, and will not again be described. The delaying unit 103 includes a delay circuit 500, the inverting output buffer 401, and the output buffer 402. The clock signal output from the clock oscillator 102 to the delaying unit 103 is input into the delay circuit 500.

The delay circuit 500 is a circuit that delays by the cycle of T/4, the clock signal input thereto and that further outputs the delayed clock signal to the inverting output buffer 401 and the output buffer 402. For example, a lumped constant circuit or a distributed constant circuit can be used as the delay circuit 500. In the example depicted in FIG. 5, the delay circuit 500 is an LC circuit that includes an inductor 501 and a capacitor 502.

A terminal of the inductor 501 is connected to an input terminal of the delay circuit 500 and the other end thereof is connected to an output terminal of the delay circuit 500. A terminal of the capacitor 502 is connected to a point between the inductor 501 and the delay circuit 500 and the other terminal thereof is connected to the ground. Thus, the clock signal obtained by delaying the clock signal input into the delaying unit 103 by the cycle of T/4 can be output to the inverting output buffer 401 and the output buffer 402.

The inverting output buffer 401 inverts the clock signal output from the delay circuit 500 and outputs the inverted clock signal to the second driving unit 202. Thus, the clock signal obtained by delaying the clock signal input into the delaying unit 103 by the cycle of 3T/4 (the second clock signal) can be output to the second driving unit 202.

The output buffer 402 outputs to the third driving unit 203, the clock signal output from the delay circuit 500. Thus, the clock signal obtained by delaying the clock signal input into the delaying unit 103 by the cycle of T/4 (the third clock signal) can be output to the third driving unit 203.

Figure 6A:
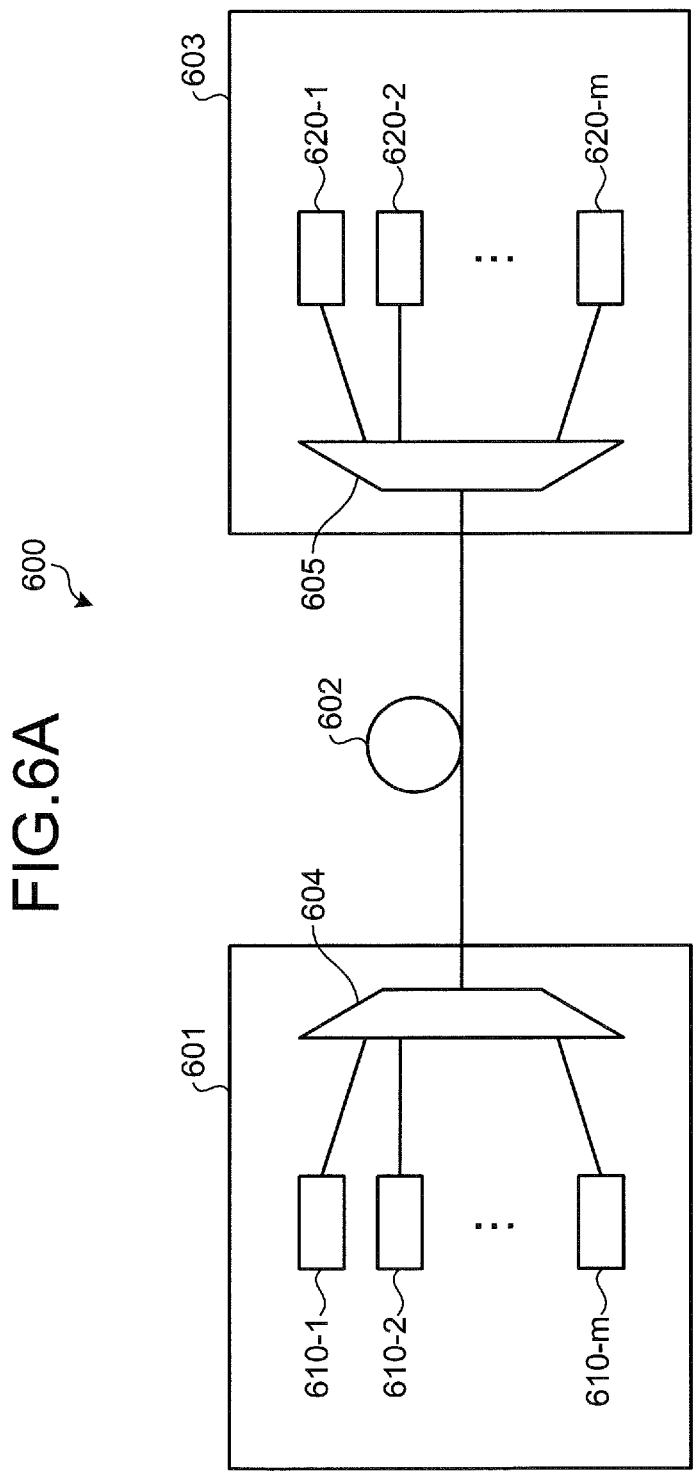
FIG. 6A is a diagram of an example of an optical transmission system that employs the optical transmission apparatus according to the first embodiment.
Figure 6B:
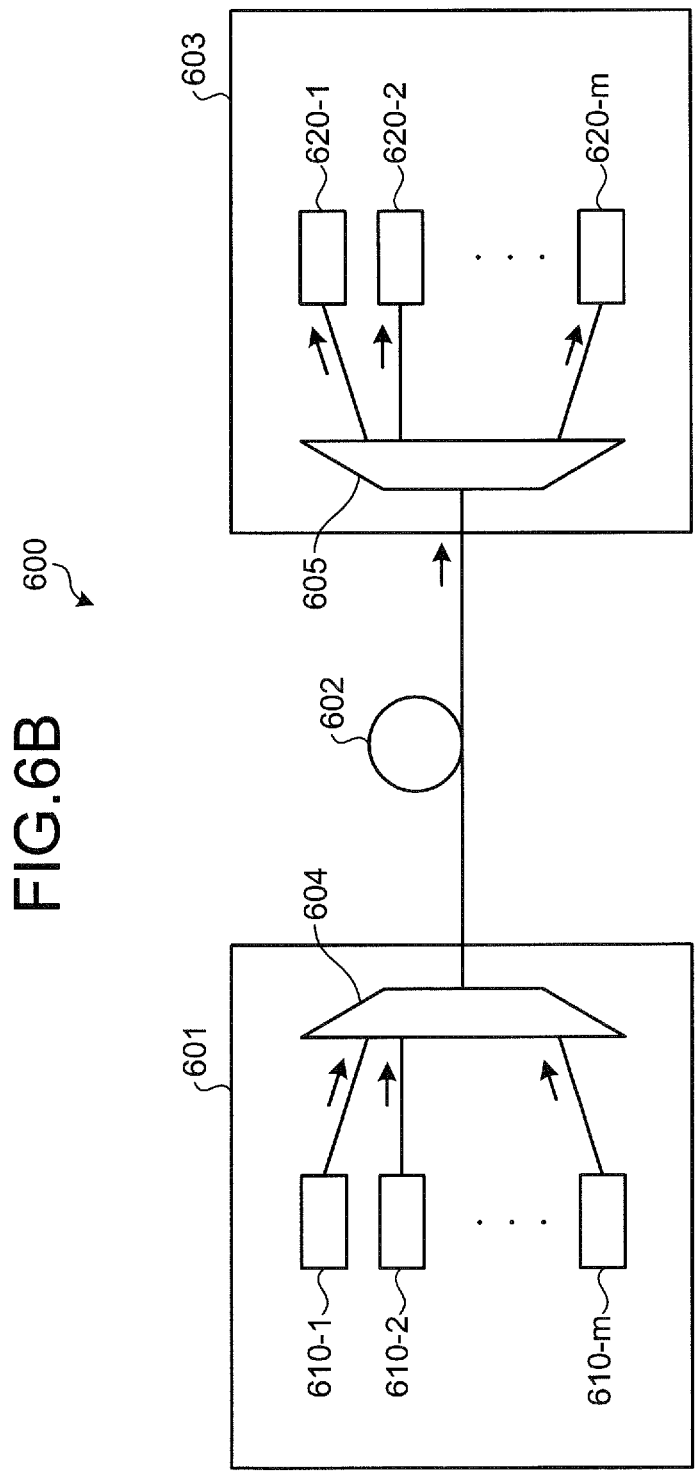
FIG. 6B is a diagram of an example of flows of light beams in the optical transmission system depicted in FIG. 6A.

An example of the optical transmission system that employs the optical transmission apparatus 100 according to the first embodiment will be described with reference to FIGS. 6A and 6B. FIG. 6A is a diagram of an example of the optical transmission system that employs the optical transmission apparatus according to the first embodiment. FIG. 6B is a diagram of an example of flows of light beams in the optical transmission system depicted in FIG. 6A. In FIGS. 6A and 6B, the optical transmission system 600 includes a transmitting apparatus 601, an optical fiber 602, and a receiving apparatus 603.

The transmitting apparatus 601 includes m optical transmitters 610-1 to 610-$m$ and a optical coupler 604. The optical transmitters 610-1 to 610-$m$ respectively generate optical signals having different wavelengths $\lambda 1$ to $\lambda m$ and output the generated optical signals to the optical coupler 604. The optical coupler 604 combines the optical signals output from the optical transmitters 610-1 to 610-$m$, and outputs the resulting optical signal to the optical fiber 602.

The optical fiber 602 transmits the optical signal output from the transmitting apparatus 601 to the receiving apparatus 603. The receiving apparatus 603 includes a separator 605 and m optical receivers 620-1 to 620-$m$. The separator 605 separates the optical signal transmitted by the optical fiber 602 into optical signals of different wavelengths $\lambda 1$ to $\lambda m$ and outputs the separated optical signals of the wavelengths $\lambda 1$ to $\lambda m$ respectively to the m optical receivers 620-1 to 620-$m$. Each of the m optical receivers 620-1 to 620-$m$ receives one of the optical signals output from the wave-decoupling unit 605.

According to the optical transmission system 600, the optical signals generated by the optical transmitters 610-1 to 610-$m$ for wavelengths at intervals of $\lambda$ can be transmitted to the optical receivers 620-1 to 620-$m$ that support the wavelengths at intervals of $\lambda$. The optical transmission apparatus 100 depicted in FIGS. 2A and 2B is applicable to, for example, each of the optical transmitters 610-1 to 610-$m$ depicted in FIGS. 6A and 6B.

A variation of the operation of the optical transmission apparatus 100 according to the first embodiment will be described with reference to FIG. 7. FIG. 7 is a timing chart of a variation of the operation of the optical transmission apparatus according to the first embodiment. In FIG. 7, components identical to those depicted in FIG. 3 will be given the same reference numerals used in FIG. 3, and will not again be described. A case will be described where the second clock signal input into the second driving unit 202 is delayed by the cycle of T/4, by the delaying unit 103.

In this case, as depicted in FIG. 7, the drive signal 302 is delayed by the cycle of T/4 relative to the drive signal 301 of the first driving unit 201. The drive signal 302 depicted in FIG. 7 is a signal obtained by inverting the drive signal 302 depicted in FIG. 3. Therefore, the waveform of the output light beam 313 is delayed with respect to that of the output light beam 314 by the cycle of T/4, and the waveform of the output light beam 331 is delayed with respect to that of the output light beam 332 by the cycle of T/4.

Thus, the phases of the output light beams 313 and 314 depicted in FIG. 3 are replaced by each other resulting in those of the output light beams 313 and 314 depicted in FIG. 7. The phases of the output light beams 331 and 332 depicted in FIG. 3 are replaced by each other resulting in those of the output light beams 331 and 332 depicted in FIG. 7.

In this case, the High time periods of the output light beams 331 to 334 are also shifted by T/4 relative to one another and therefore, the combining of the output light beams 331 to 334 with each other enables generation of the quad-division multiplexed optical signal having the cycle of T/4. Execution of the modulation for each of the divided output light beams 313 to 316 enables acquisition of the output light beam 340 whose value is switched at the cycle of T/4 even when the cycle of each of the drive signals 321 to 324 is T.

As described, according to the optical transmission apparatus 100 of the first embodiment, such signals are used as the second clock signal that is delayed with respect to the first clock signal by T/4 and the third clock signal obtained by inverting the second clock signal. Thus, the condition for the interference of the second and the third Mach-Zehnder modulators 212 and 213 is switched during the time periods during which the optical clock pulses that are input into the second and the third Mach-Zehnder modulators 212 and 213 rise.

Therefore, the optical clock pulses input into the second and the third Mach-Zehnder modulators 212 and 213 can each be further divided into two optical clock pulses. Consequently, a high speed optical signal based on the quad-division multiplexing can be generated even without the use of a high speed circuit in the data driving unit 120 or the first to the fourth data modulators 121 to 124.

In the first embodiment, a configuration has been described that adjusts, via the delaying unit 103, the delay of the clock signal input into the second and the third clock modulators 112 and 113. However, the configuration is not limited to the above. For example, the optical transmission apparatus 100 only has to be configured to adjust and shift the relative phases of the clock signals that are input into the first, the second, and the third clock modulators 111, 112, and 113.

For example, the optical transmission apparatus 100 may be configured to adjust, via the delaying unit 103, the delay of the clock signal that is input into the first and the second clock modulators 111 and 112. Further, the optical transmission apparatus 100 may be configured to adjust, via the delaying unit 103, the delay of the clock signal that is input into the first and the third clock modulators 111 and 113. Further, the optical transmission apparatus 100 may be configured to adjust, via the delaying unit 103, the delay of the clock signal that is input into the first, the second, and the third clock modulators 111, 112, and 113.

A second embodiment of the optical transmission apparatus will be described. In the first embodiment, a case has been described where the cycle of the drive signal of each of the second and the third driving units 202 and 203 is T. However, in the second embodiment, a case will be described where the cycle of the drive signal of each of the second and the third driving units 202 and 203 is T/2. In the second embodiment, components will be described that differ from the first embodiment.

Figure 8A:
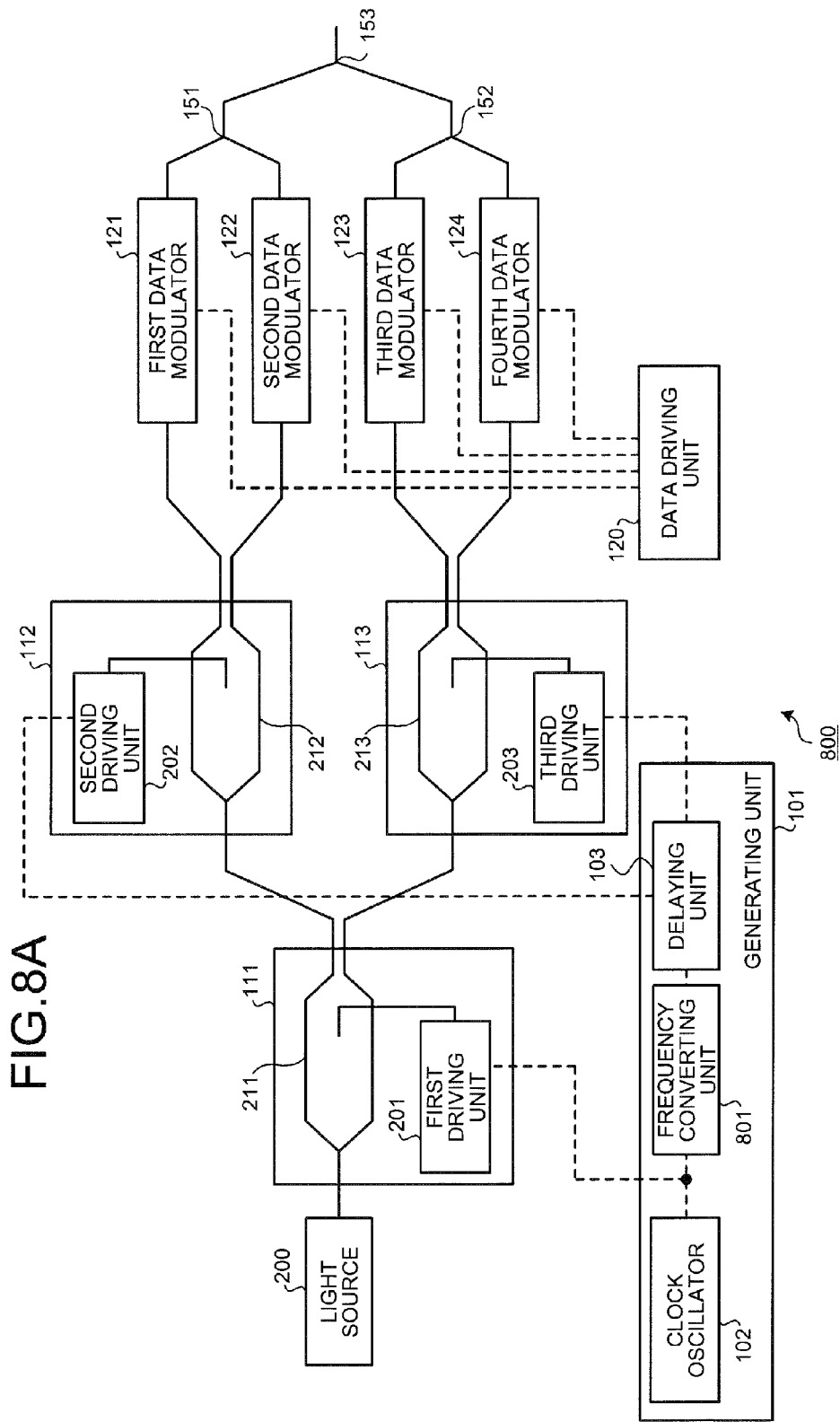
FIG. 8A is a diagram of a configuration of the optical transmission apparatus according to a second embodiment.
Figure 8B:
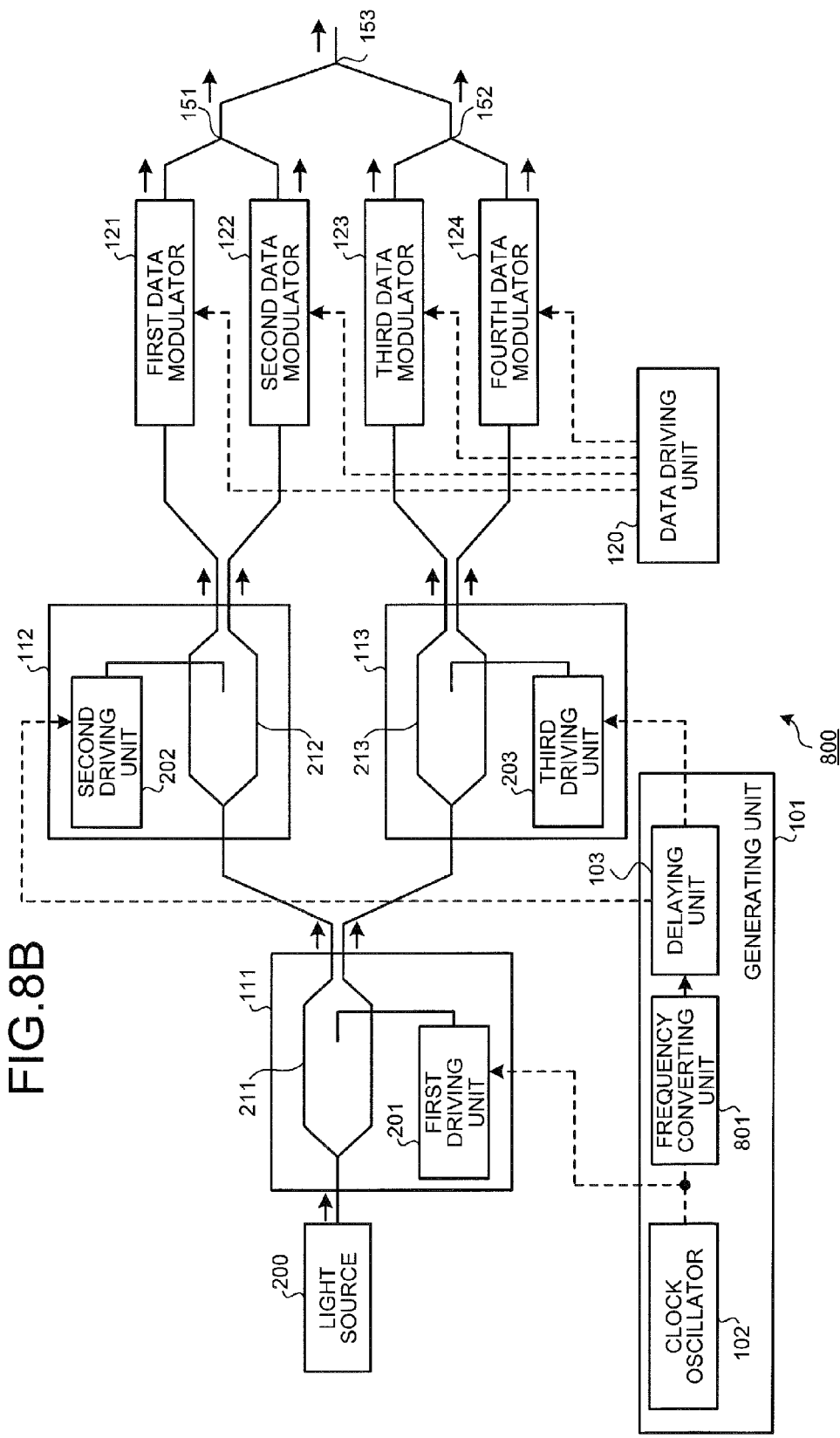
FIG. 8B is a diagram of an example of flows of light beams and electrical signals in the optical transmission apparatus depicted in FIG. 8A.

FIG. 8A is a diagram of a configuration of the optical transmission apparatus according to the second embodiment. FIG. 8B is a diagram of an example of flows of light beams and electrical signals in the optical transmission apparatus depicted in FIG. 8A. In FIGS. 8A and 8B, components identical to those depicted in FIGS. 1A and 1B will be given the same reference numerals used in FIGS. 1A and 1B, and will not again be described. As depicted in FIGS. 8A and 8B, the optical transmission apparatus 800 according to the second embodiment includes a frequency converting unit 801 in addition to the delaying unit 103 of the optical transmission apparatus 100 depicted in FIGS. 2A and 2B.

The clock oscillator 102 outputs the clock signal to the first clock modulator 111 and the frequency converting unit 801. The frequency converting unit 801 converts the frequency of the clock signal output from the clock oscillator 102 and outputs a second clock signal after the conversion to the delaying unit 103. For example, the frequency converting unit 801 doubles (multiplies) the frequency of the clock signal output from the clock oscillator 102.

For example, the delaying unit 103 outputs to the second clock modulator 112, as the second clock signal, a clock signal that is the clock signal output from the frequency converting unit 801 without any delaying being induced. The delaying unit 103 outputs to the third clock modulator 113, the third clock signal obtained by delaying the clock signal output from the frequency converting unit 801 by a predetermined amount. For example, the delaying unit 103 outputs the third clock signal obtained by delaying the clock signal output from the frequency converting unit 801 by the cycle of T/2. Thus, the third clock signal obtained by inverting the second clock signal can be output to the third clock modulator 113.

In this manner, the optical transmission apparatus 800 can set the frequency of each of the second and the third clock signals output to the second and the third clock modulators 112 and 113 to be the frequency obtained by doubling the frequency of the first clock signal output to the first clock modulator 111. The third clock signal can be delayed by the cycle of T/2 with respect to the second clock signal.

FIG. 9 is a timing chart of an example of the operation of the optical transmission apparatus according to the second embodiment. In FIG. 9, components identical to those depicted in FIG. 3 will be given the same reference numerals used in FIG. 3, and will not again be described. As depicted in FIG. 9, the drive signal 302 output from the second driving unit 202 to the second Mach-Zehnder modulator 212 is a signal that alternately repeats "High" and "Low" at the cycle of T/2.

The drive signal 303 output from the third driving unit 203 to the third Mach-Zehnder modulator 213 is a signal that alternately repeats "High" and "Low" at the cycle of T/2 and is a signal obtained by inverting the drive signal 302 of the second driving unit 202.

In this case, the waveform of the output light beam 315 of the third Mach-Zehnder modulator 213 is a waveform that is delayed by T/4 with respect to that of the output light beam 316. The waveform of the output light beam 333 of the third data modulator 123 is a waveform that is delayed by the cycle of T/4 with respect to that of the output light beam 334. The waveform of the output light beam 316 of the third Mach-Zehnder modulator 213 is a waveform that is advanced by the cycle of T/4 with respect to that of the output light beam 315. The waveform of the output light beam 334 of the third data modulator 123 is a waveform that is advanced by the cycle of T/4 with respect to that of the output light beam 333.

Thus, the High time periods of the output light beams 331 to 334 are shifted by T/4 relative to one another and therefore, the combining of the output light beams 331 to 334 with each other enables generation of the quad-division multiplexed optical signal whose cycle is T/4. Execution of the modulation for each of the divided output light beams 313 to 316 enables acquisition of the output light beam 340 whose value is switched at the cycles of T/4 even when the cycle of each of the drive signals 321 to 324 is T.

As described, according to the optical transmission apparatus 800 of the second embodiment, the cycle of the drive signal of the second and the third driving units 202 and 203 is set to be a half of the cycle of the drive signal of the first driving unit 201. Thus, the condition for the interference of the second and the third clock modulators 112 and 113 is switched during the time periods during which the optical clock pulses that are input into the second and the third clock modulators 112 and 113 rise up. Therefore, the optical clock pulses input into the second and the third clock modulators 112 and 113 can each be further divided into the two optical clock pulses. Consequently, a high speed optical signal based on the quad-division multiplexing can be generated even without the use of a high speed circuit in the data driving unit 120 or the first to the fourth data modulators 121 to 124.

In the second embodiment, the optical transmission apparatus 800 merely has to be able to relatively double the frequency between the drive signals 301 and 302 and between the drive signals 301 and 303. For example, configuration may be such that the frequency converting unit 801 is not disposed between the clock oscillator 102 and the delaying unit 103, but rather is disposed between the clock oscillator 102 and the first driving unit 201.

The frequency merely has to be relatively doubled between the drive signals 301 and 302 and between the drive signals 301 and 303 by outputting the clock signal converted by the frequency converting unit 801 to the first driving unit 201.

A third embodiment of the optical transmission apparatus will be described for components that differ from the second embodiment. In the optical transmission apparatus 800 according to the third embodiment, the frequency of each of the second and the third clock signals output to the second and the third driving units 202 and 203 is set to be a half of the frequency of the first clock signal output to the first driving unit 201.

The optical transmission apparatus 800 according to the third embodiment will be described with reference to FIGS. 8A and 8B. For example, the clock oscillator 102 outputs the drive signal 301 (clock signal) whose cycle is T/2. The generating unit 101 generates the second clock signal that rises during the odd-numbered rising time periods of the first clock signal and that falls during the even-numbered rising time periods thereof.

The generating unit 101 generates the third clock signal that rises during the odd-numbered falling time periods of the first clock signal and that falls during the even-numbered falling time periods thereof.

For example, the frequency converting unit 801 sets the frequency of the first clock signal output from the clock oscillator 102 to be a half thereof (division).

Thus, the frequency of each of the second and the third clock signals output to the second and the third driving units 202 and 203 can be set to be the frequency that is a half of the frequency of the first clock signal output to the first driving unit 201. The third clock signal can be delayed by the cycle of T/2 with respect to the second clock signal.

FIG. 10 is a timing chart of an example of the operation of the optical transmission apparatus according to the third embodiment. In FIG. 10, the drive signal 301 is a signal that alternately repeats "High" and "Low" and whose cycle is T/2. In FIG. 10, components identical to those depicted in FIG. 9 will be given the same reference numerals used in FIG. 9, and will not again be described.

The waveform of the output light beam 313 of the second Mach-Zehnder modulator 212 is advanced by the cycle of T/2 with respect to that of the output light beam 314 of the second Mach-Zehnder modulator 212. The waveform of the output light beam 331 of the first data modulator 121 is advanced by the cycle of T/2 with respect to that of the output light beam 332 of the second data modulator 122. The waveform of the output light beam 315 of the third Mach-Zehnder modulator 213 is advanced by the cycle of T/2 with respect to that of the output light beam 316 of the third Mach-Zehnder modulator 213. The waveform of the output light beam 333 of the third data modulator 123 is advanced by the cycle of T/2 with respect to that of the output light beam 334 of the fourth data modulator 124.

In this case, the High time periods of the output light beams 331 to 334 are shifted by T/4 with respect to one another and therefore, the combining of the output light beams 331 to 334 with each other enables generation of the quad-division multiplexed optical signal whose cycle is T/4. The execution of the modulation for each of the divided output light beams 313 to 316 enables the acquisition of the output light beam 340 whose value is switched at the cycle of T/4 even when the cycle of each of the drive signals is T.

As described, according to the optical transmission apparatus 800 of the third embodiment, the cycle of the drive signal of the first driving unit 201 is set to be a half of the cycle of the drive signal of the second and the third driving units 202 and 203. Thus, the condition for the interference in each of the second and the third clock modulators 112 and 113 is switched according to whether the each optical clock pulse is odd-numbered one or even-numbered one of the optical clock pulses input into the second and the third clock modulators 112 and 113. Therefore, the optical clock pulses input into the second and the third clock modulators 112 and 113 can each be further divided into the two optical clock pulses. Therefore, a high speed optical signal based on the quad-division multiplexing can be generated even without the use of a high speed circuit in the data driving unit 120 or the first to the fourth data modulators 121 to 124.

In the third embodiment, the optical transmission apparatus 800 merely has to be able to relatively decrease the frequency to a half thereof between the drive signals 301 and 302 and between the drive signals 301 and 303. For example, configuration may be such that the frequency converting unit 801 is not disposed between the clock oscillator 102 and the delaying unit 103 but rather is disposed between the clock oscillator 102 and the first driving unit 201.

The frequency merely has to be relatively decreased to a half thereof between the drive signals 301 and 302 and between the drive signals 301 and 303 by outputting the clock signal converted by the frequency converting unit 801 to the first driving unit 201.

A fourth embodiment of the optical transmission apparatus will be described. In the fourth embodiment, a case for octa-division multiplexing will be described. In the fourth embodiment, components that differ from the first to the third embodiments will be described.

Figure 11A:
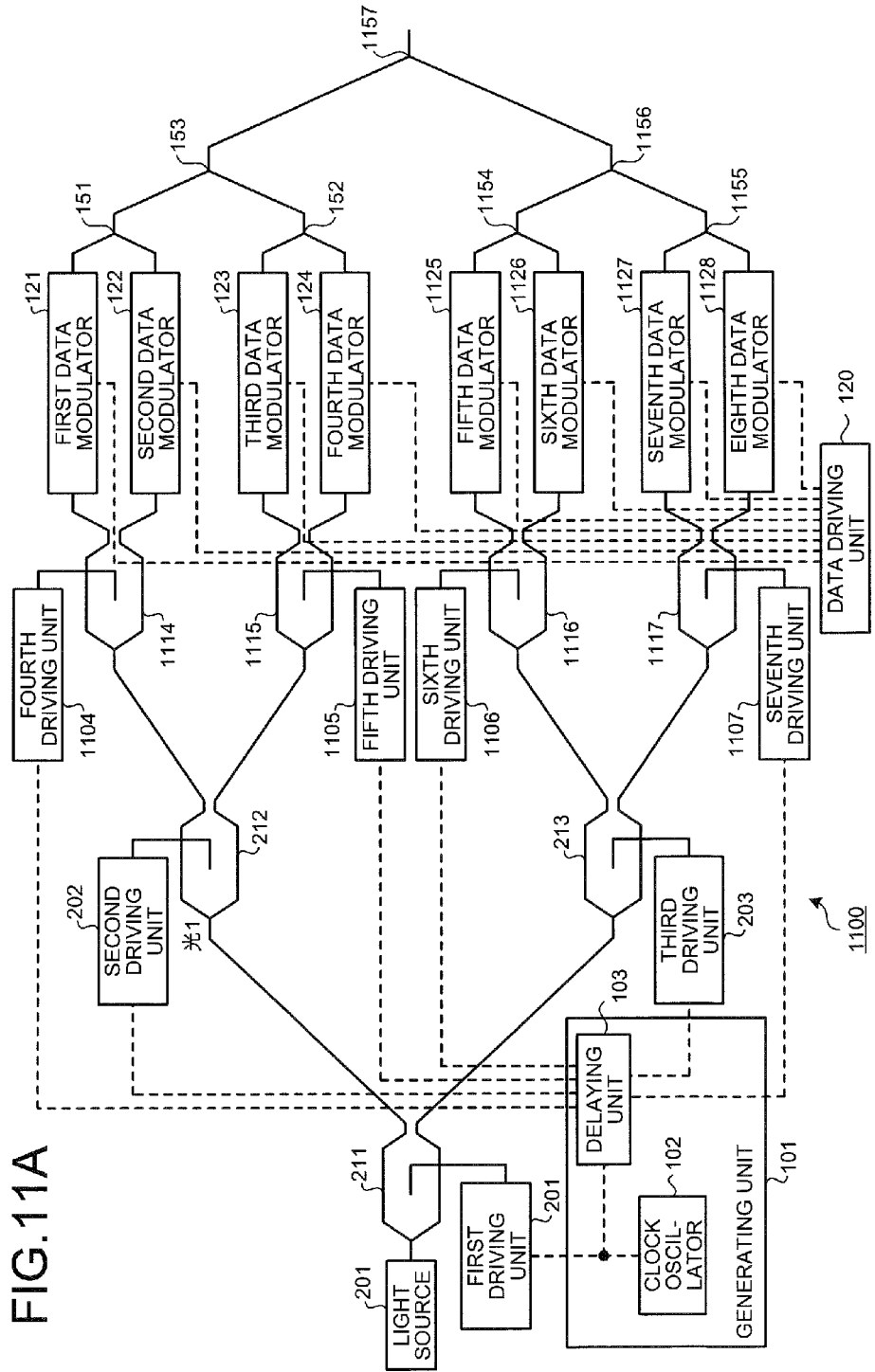
FIG. 11A is a diagram of a configuration of the optical transmission apparatus according to a fourth embodiment.
Figure 11B:
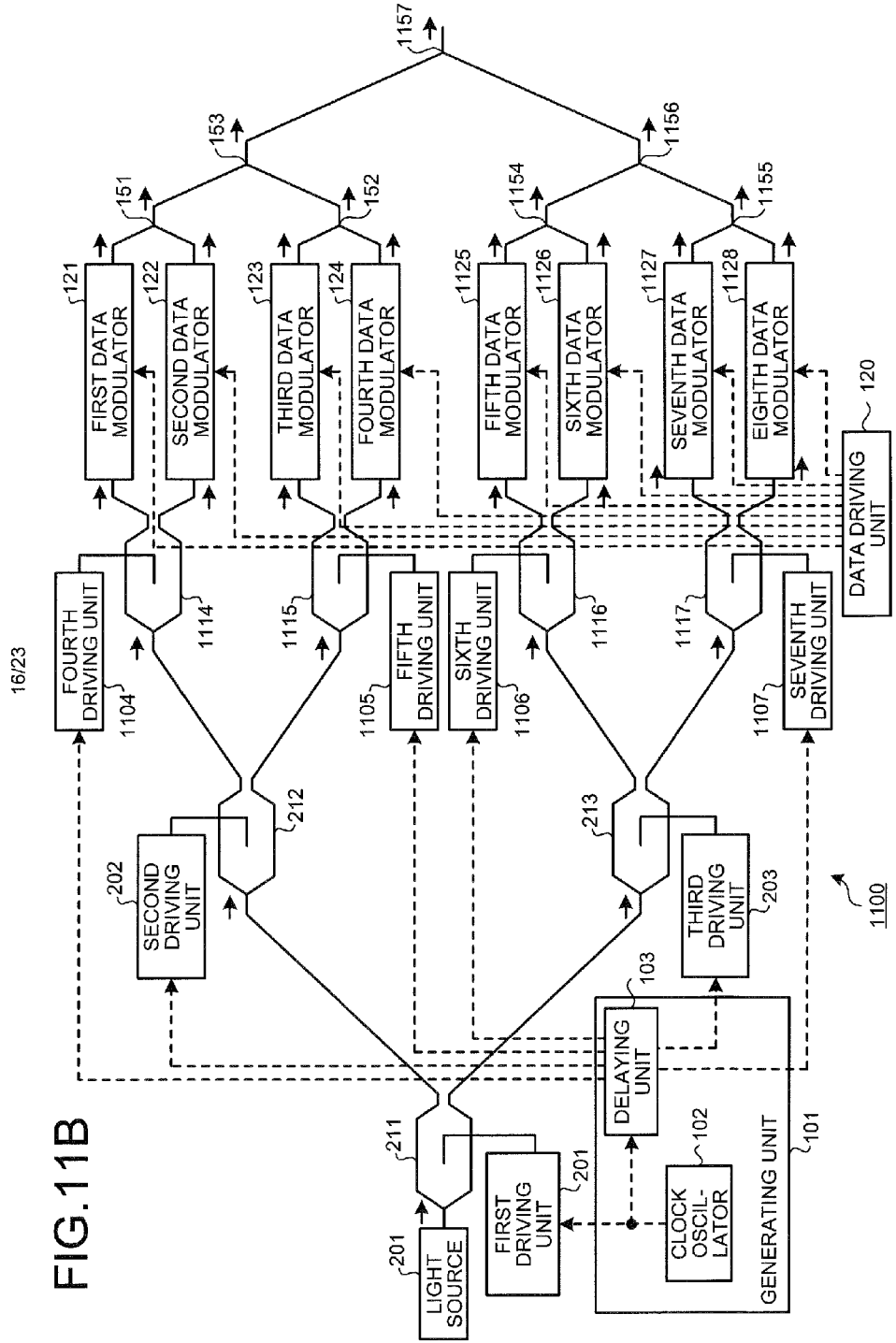
FIG. 11B is a diagram of an example of flows of light beams and electrical signals in the optical transmission apparatus depicted in FIG. 11A.

FIG. 11A is a diagram of a configuration of the optical transmission apparatus according to the fourth embodiment. FIG. 11B is a diagram of an example of flows of light beams and electrical signals in the optical transmission apparatus depicted in FIG. 11A.

As depicted in FIGS. 11A and 11B, an optical transmission apparatus 1100 according to the fourth embodiment includes a fourth to a seventh driving units 1104 to 1107, a fourth to a seventh Mach-Zehnder modulators 1114 to 1117, a fifth to a eighth data modulators 1125 to 1128, and optical couplers 1154 to 1157 in addition to the configuration of the optical transmission apparatus 100 depicted in FIGS. 2A and 2B.

In the optical transmission apparatus 1100 according to the fourth embodiment, two output light beams from the first Mach-Zehnder modulator 211 are divided into four output light beams by the second and the third Mach-Zehnder modulators 212 and 213. The four output light beams divided by the second and the third Mach-Zehnder modulators 212 and 213 are divided into eight output light beams by the fourth to the seventh Mach-Zehnder modulators 1114 to 1117.

For example, the delaying unit 103 delays the clock signal output from the clock oscillator 102 by a predetermined amount and outputs the delayed clock signal to the second to the seventh driving units 202, 203, and 1104 to 1107.

The delaying unit 103 delays a fourth clock signal output to the fourth driving unit 1104 with respect to the first clock signal by, for example, the cycle of 5T/8; delays a fifth clock signal output to the fifth driving unit 1105 with respect to the first clock signal by, for example, the cycle of 7T/8; delays a sixth clock signal output to the sixth driving unit 1106 with respect to the first clock signal by, for example, the cycle of T/8; and delays a seventh clock signal output to the seventh driving unit 1107 with respect to the first clock signal by, for example, the cycle of 3T/8.

The second Mach-Zehnder modulator 212 outputs to the fourth Mach-Zehnder modulator 1114, one light beam among the light beams obtained by the interference and outputs to the fifth Mach-Zehnder modulator 1115, the other light beam among the light beams. The light beams output from the second Mach-Zehnder modulator 212 are a pair of light beams whose intensities are inverted with respect to each other.

The third Mach-Zehnder modulator 213 outputs one of the light beams obtained by the interference, to the sixth Mach-Zehnder modulator 1116 and outputs the other light beam of the light beams to the seventh Mach-Zehnder modulator 1117. The light beams output from the third Mach-Zehnder modulator 213 are a pair of light beams whose intensities are inverted with respect to each other.

The fourth driving unit 1104 applies to an electrode of the fourth Mach-Zehnder modulator 1114, a drive signal that is based on the fourth clock signal output from the delaying unit 103. For example, the fourth driving unit 1114 outputs a binary signal representing a predetermined clock frequency to the electrode of the fourth Mach-Zehnder modulator 1114 at a timing delayed by a predetermined amount, by the delaying unit 103.

For example, when the fourth clock signal output from the delaying unit 103 is "High", a highest voltage is applied to the electrode of the fourth Mach-Zehnder modulator 1114 and when the fourth clock signal output therefrom is "Low", a lowest voltage is applied to the electrode of the fourth Mach-Zehnder modulator 1114.

The fourth Mach-Zehnder modulator 1114 branches the light beam output from the second Mach-Zehnder modulator 212; causes the resulting light beams to interfere with each other; and then outputs one of the light beams obtained to the first data modulator 121 and the other thereof to the second data modulator 122. The fourth Mach-Zehnder modulator 1114 also varies the phase difference of the light beams, according to the voltage applied thereto by the fourth driving unit 1104.

Thus, the intensity ratios of the light beams output to the first and the second data modulators 121 and 122 are varied according to the voltage applied thereto by the fourth driving unit 1104. The light beams output from the fourth Mach-Zehnder modulator 1114 are a pair of light beams whose intensities are inverted with respect to each other.

For example, when the fourth clock signal output from the delaying unit 103 is "High", the voltage applied to the electrode of the fourth Mach-Zehnder modulator 1114 becomes the highest. When the voltage becomes the highest that is applied to the electrode of the fourth Mach-Zehnder modulator 1114, the intensity of the light beam output to the first data modulator 121 becomes the highest and the intensity of the light beam output to the second data modulator 122 becomes the lowest.

When the fourth clock signal output from the delaying unit 103 is "Low", the voltage applied to the electrode of the fourth Mach-Zehnder modulator 1114 becomes the lowest. When the voltage becomes the lowest that is applied to the electrode of the fourth Mach-Zehnder modulator 1114, the intensity of the light beam output to the first data modulator 121 becomes the lowest and the intensity of the light beam output to the second data modulator 122 becomes the highest.

Outputting of each of the light beams by the fifth to the seventh Mach-Zehnder modulators 1115 to 1117, to the third to the eighth data modulators 123 to 1128 is same as the outputting of the light beam by the fourth Mach-Zehnder modulator 1114.

The data driving unit 120 outputs to the first to the eighth data modulators 121 to 1128, drive signals that are based on the data signals. The first and the second data modulators 121 and 122 modulate the light beam output from the fourth Mach-Zehnder modulator 1114 using the drive signal output from the data driving unit 120. The third and the fourth data modulators 123 and 124 modulates the light beam output from the fifth Mach-Zehnder modulator 1115 using the drive signal output from the data driving unit 120.

The fifth and the sixth data modulators 125 and 1126 modulate the light beam output from the sixth Mach-Zehnder modulator 1116 using the drive signal output from the data driving unit 120. The fifth and the sixth data modulators 125 and 126 output the light beams obtained by the modulation to the optical coupler 1154.

The seventh and the eighth data modulators 1127 and 1128 modulate the light beam output from the seventh Mach-Zehnder modulator 1117 using the drive signal output from the data driving unit 120. The seventh and the eighth data modulators 1127 and 1128 output the light beams obtained by the modulation to the optical coupler 1155.

The optical coupler 1154 combines the optical signals output from the fifth and the sixth data modulators 1125 and 1126 and outputs the combined optical signal to the optical coupler 1156. The optical coupler 1155 combines the optical signals output from the seventh and the eighth data modulators 1127 and 1128 and outputs the combined optical signal to the optical coupler 1156.

The optical coupler 1156 combines the optical signals output from the optical couplers 1154 and 1155 and outputs the combined optical signal to the optical coupler 1157. The optical coupler 1157 combines the optical signals output from the optical couplers 153 and 1156 and outputs the combined optical signal.

As described, in the optical transmission apparatus 1100, the first clock signal is used for the first Mach-Zehnder modulator 211 upstream. For the second Mach-Zehnder modulator 212 midstream, the second clock signal is used that rises or falls during the time periods during which the first clock signal rises. For the third Mach-Zehnder modulator 213 midstream, the third clock signal is used that rises or falls during the time periods during which the first clock signal falls.

For the fourth Mach-Zehnder modulator 1114 downstream, the fourth clock signal is used that rises or falls during the time periods during which the second clock signal rises. For the fifth Mach-Zehnder modulator 1115 downstream, the fifth clock signal is used that rises or falls during the time periods during which the second clock signal falls.

For the sixth Mach-Zehnder modulator 1116 downstream, the sixth clock signal is used that rises or falls during the time periods during which the third clock signal rises. For the seventh Mach-Zehnder modulator 1117 downstream, the seventh clock signal is used that rises or falls during the time periods during which the third clock signal falls.

Thus, the condition for the interference in the fourth to the seventh Mach-Zehnder modulators 1114 to 1117 is switched during the time periods during which the optical clock pulses that are input into the fourth to the seventh Mach-Zehnder modulators 1114 to 1117 rise up. Therefore, the optical clock pulses input into the fourth to the seventh Mach-Zehnder modulators 1114 to 1117 can each be further divided into the two optical clock pulses.

FIG. 12 is a timing chart of an example of the operation of the optical transmission apparatus according to the fourth embodiment. In FIG. 12, a drive signal 1204 represents the drive signal that is output from the fourth driving unit 1104 to the fourth Mach-Zehnder modulator 1114. The drive signal 1204 is a signal that alternately repeats "High" and "Low" at the cycle of T. The drive signal 1204 is delayed by the cycle of 5T/8 compared to the drive signal 301 of the first driving unit 201.

A drive signal 1205 represents the drive signal that is output from the fifth driving unit 1105 to the fifth Mach-Zehnder modulator 1115. The drive signal 1205 is a signal that alternately repeats "High" and "Low" at the cycle of T. The drive signal 1205 is delayed by the cycle of 7T/8 compared to the drive signal 301 of the first driving unit 201.

A drive signal 1206 represents the drive signal that is output from the sixth driving unit 1106 to the sixth Mach-Zehnder modulator 1116. The drive signal 1206 is a signal that alternately repeats "High" and "Low" at the cycle of T. The drive signal 1206 is delayed by the cycle of T/8 compared to the drive signal 301 of the first driving unit 201.

A drive signal 1207 represents the drive signal that is output from the seventh driving unit 1107 to the seventh Mach-Zehnder modulator 1117. The drive signal 1207 is a signal that alternately repeats "High" and "Low" at the cycle of T. The drive signal 1207 is delayed by the cycle of 3T/8 compared to the drive signal 301 of the first driving unit 201.

An output light beam 1217 is a light beam that is output to the first data modulator 121 by the fourth Mach-Zehnder modulator 1114 according to the drive signal 1204. The output light beam 1217 is a light beam that is "High" only during the time periods during which the output light beam 313 and the drive signal 1204 are both "High". An output light beam 1218 is a light beam that is output to the second data modulator 122 by the fourth Mach-Zehnder modulator 1114 according to the drive signal 1204. The output light beam 1218 is a light beam that is "High" only during the time periods during which the output light beam 313 is "High" and the drive signal 1204 is "Low".

An output light beam 1219 is a light beam that is output to the third data modulator 123 by the fifth Mach-Zehnder modulator 1115 according to the drive signal 1205. The output light beam 1219 is a light beam that is "High" only during the time periods during which the output light beam 314 and the drive signal 1205 are both "High". An output light beam 1220 is a light beam that is output to the fourth data modulator 124 by the fifth Mach-Zehnder modulator 1115 according to the drive signal 1205. The output light beam 1220 is a light beam that is "High" only during the time periods during which the output light beam 314 is "High" and the drive signal 1205 is "Low".

An output light beam 1221 is a light beam that is output to the fifth data modulator 1125 by the sixth Mach-Zehnder modulator 1116 according to the drive signal 1206. The output light beam 1221 is a light beam that is "High" only during the time periods during which the output light beam 315 and the drive signal 1206 are both "High". An output light beam 1222 is a light beam that is output to the sixth data modulator 1126 by the sixth Mach-Zehnder modulator 1116 according to the drive signal 1206. The output light beam 1222 is a light beam that is "High" only during the time periods during which the output light beam 315 is "High" and the drive signal 1206 is "Low".

An output light beam 1223 is a light beam that is output to the seventh data modulator 1127 by the seventh Mach-Zehnder modulator 1117 according to the drive signal 1207. The output light beam 1223 is a light beam that is "High" only during the time periods during which the output light beam 316 and the drive signal 1207 are both "High". An output light beam 1224 is a light beam that is output to the eighth data modulator 1128 by the seventh Mach-Zehnder modulator 1117 according to the drive signal 1207. The output light beam 1224 is a light beam that is "High" only during the time periods during which the output light beam 316 is "High" and the drive signal 1207 is "Low".

Thus, the output light beams 1217 to 1224 are light beams whose High time periods are shifted by T/8 with respect to one another.

A drive signal 1230 represents a drive signal that is output to the first to the eighth data modulators 121 to 1128 by the data driving unit 120. The drive signal 1230 is a signal that takes a value of "1" or "0" according to the data signal that is input into the data driving unit 120.

The "High" time periods of each of the output light beams 1217 to 1224 is modulated by the value of "1" or "0" according to the drive signal 1230. The modulated output light beams are output to the downstream optical couplers 151, 152, 1154, and 1155.

An output light beam 1240 is a light beam that is output from the optical coupler 1157. The output light beam 1240 is a light beam obtained by combining the output light beams 1217 to 1224 that are modulated by the value of "1" or "0". The High time periods of each of the output light beams 1217 to 1224 are shifted by T/8 with respect to one another and therefore, the combining of the output light beams 1217 to 1224 with each other enables generation of an octa-division multiplexed optical signal whose cycle is T/8.

Execution of the modulation for the divided output light beams 1217 to 1224 enables the acquisition of the output light beam 1240 whose value is switched at the cycle of T/8 even when the cycle of the drive signal 1230 is T.

Figure 13:
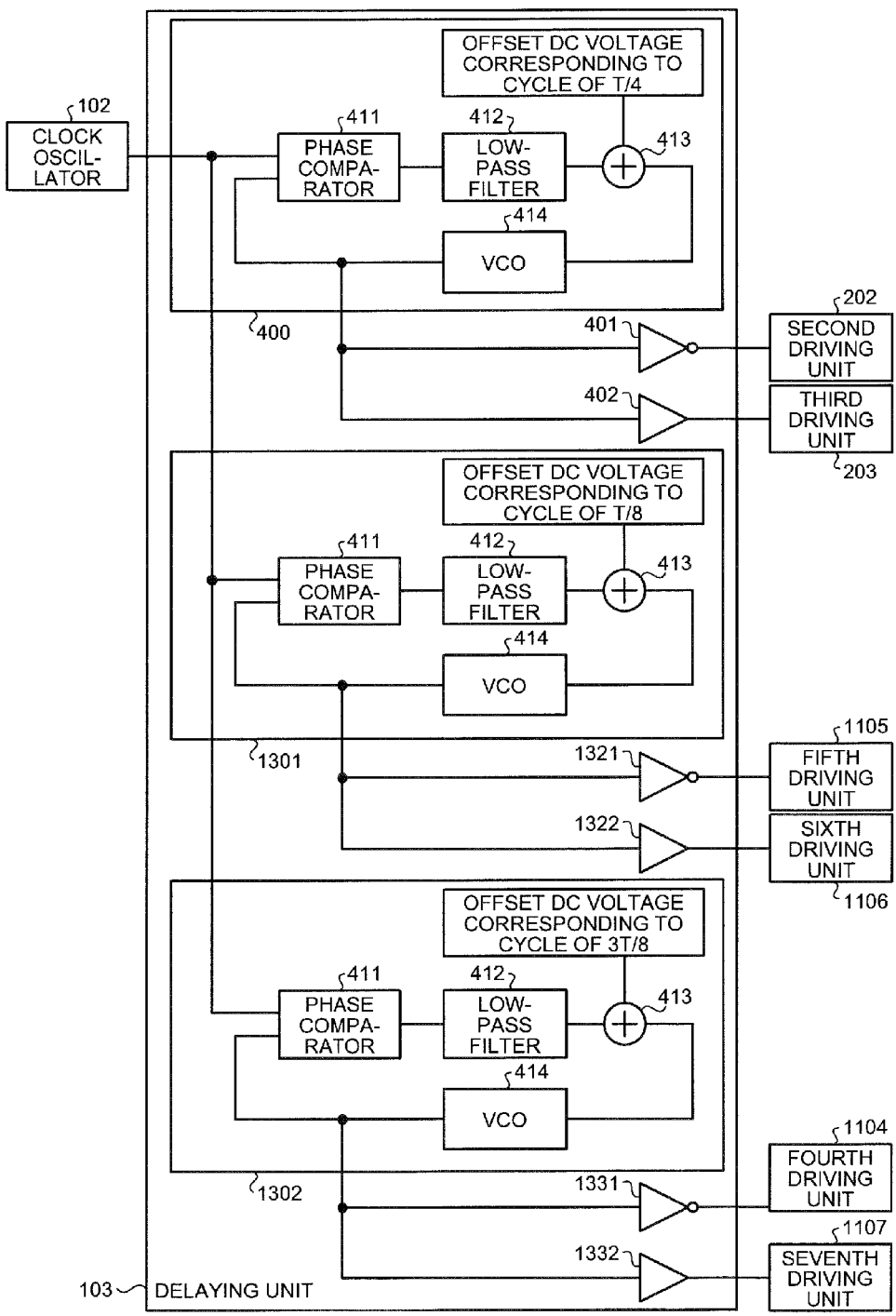
FIG. 13 is a diagram of an example of the configuration of the delaying unit for octa-division multiplexing.

FIG. 13 is a diagram of an example of the configuration of the delaying unit for the octa-division multiplexing. As depicted in FIG. 13, the delaying unit 103 includes PLL circuits 1301 and 1302, inverting output buffers 1321 and 1331, and output buffers 1322 and 1332 in addition to the PLL circuit 400, the inverting output buffer 401, and the output buffer 402 depicted in FIG. 4. The clock signal output from the clock oscillator 102 to the delaying unit 103 is input into the PLL circuits 400, 1301, and 1302.

The PLL circuits 1301 and 1302 each have a configuration identical to that of the PLL circuit 400 depicted in FIG. 4. However, the adder 413 of the PLL circuit 1301 adds the signal output from the low-pass filter 412 and the offset DC voltage for the cycle of T/8, and outputs a signal indicating the result of the addition to the VCO 414. Thus, the PLL circuit 1301 can output to the inverting output buffer 1321 and the output buffer 1322, a clock signal obtained by delaying by the cycle of T/8, the clock signal input into the delaying unit 103.

The adder 413 of the PLL circuit 1302 adds the signal output from the low-pass filter 412 and the offset DC voltage for the cycle of 3T/8, and outputs a signal indicating the result of the addition to the VCO 414. Thus, the PLL circuit 1302 can output to the inverting output buffer 1331 and the output buffer 1332, a clock signal obtained by delaying by the cycle of 3T/8 the clock signal input into the delaying unit 103.

The inverting output buffer 1321 inverts the clock signal output from the PLL circuit 1301 and outputs the inverted signal to the fifth driving unit 1105. Thus, the clock signal obtained by delaying by the cycle of 7T/8 the clock signal input into the delaying unit 103 (the fifth clock signal) can be output to the fifth driving unit 1105.

The output buffer 1322 outputs to the sixth driving unit 1106, the clock signal output from the PLL circuit 1301. Thus, the clock signal obtained by delaying by the cycle of T/8 the clock signal input into the delaying unit 103 (the sixth clock signal) can be output to the sixth driving unit 1106.

The inverting output buffer 1331 inverts the clock signal output from the PLL circuit 1302 and outputs the inverted signal to the fourth driving unit 1104. Thus, the clock signal obtained by delaying by the cycle of 5T/8 the clock signal input into the delaying unit 103 (the fourth clock signal) can be output to the first driving unit 1101.

The output buffer 1332 outputs the clock signal output from the PLL circuit 1302 to the seventh driving unit 1107. Thus, the clock signal obtained by delaying by the cycle of 3T/8 the clock signal input into the delaying unit 103 (the seventh clock signal) can be output to the seventh driving unit 1106.

Figure 14:
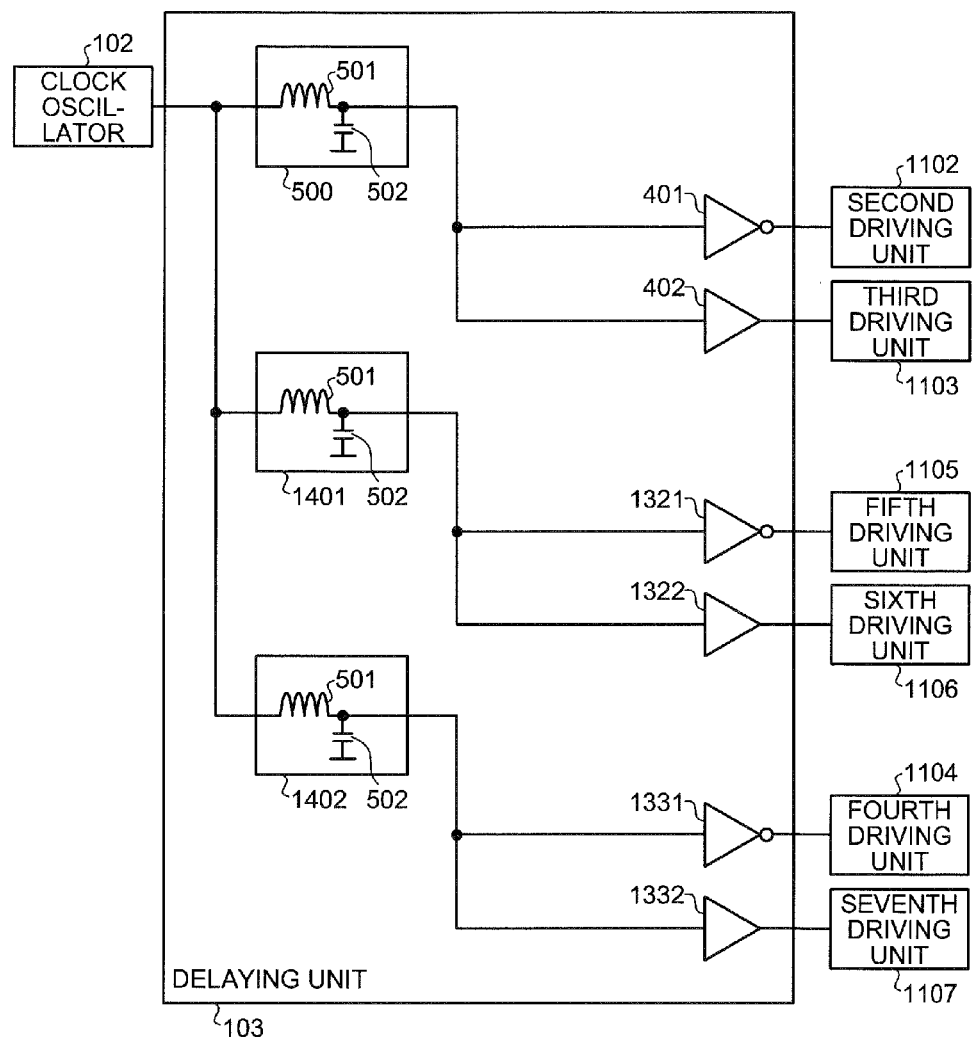
FIG. 14 is a diagram of another example of the configuration of the delaying unit for the octa-division multiplexing.

FIG. 14 is a diagram of another example of the configuration of the delaying unit for the octa-division multiplexing. In FIG. 14, components identical to those depicted in FIG. 13 will be given the same reference numerals used in FIG. 13, and will not again be described. As depicted in FIG. 14, the delaying unit 103 includes delay circuits 1401 and 1402, inverting output buffers 1321 and 1331, and output buffers 1322 and 1332 in addition to the delay circuit 500, the inverting output buffer 401, and the output buffer 402 depicted in FIG. 5.

The delay circuits 1401 and 1402 each have a configuration identical to that of the delay circuit 500 depicted in FIG. 5. However, the delay circuit 1401 is a circuit to delay the clock signal by the cycle of T/8. Thus, the delay circuit 1401 can output to the inverting output buffer 1321 and the output buffer 1322, a clock signal obtained by delaying by the cycle of T/8 the clock signal input into the delaying unit 103.

The delay circuit 1402 is a circuit that delays the clock signal by the cycle of 3T/8. Thus, the delay circuit 1402 can output to the inverting output buffer 1331 and the output buffer 1332, a clock signal obtained by delaying by the cycle of 3T/8, the clock signal input into the delaying unit 103.

The inverting output buffer 1321 inverts the clock signal output from the delay circuit 1401 and outputs the inverted signal to the fifth driving unit 1105. Thus, the clock signal obtained by delaying by the cycle of 7T/8 the clock signal input into the delaying unit 103 (the fifth clock signal) can be output to the fifth driving unit 1105.

The output buffer 1322 outputs the clock signal output from the delay circuit 1401 to the sixth driving unit 1106. Thus, the clock signal obtained by delaying by the cycle of T/8 the clock signal input into the delaying unit 103 (the sixth clock signal) can be output to the sixth driving unit 1106.

The inverting output buffer 1331 inverts the clock signal output from the delay circuit 1402 and outputs the inverted signal to the fourth driving unit 1104. Thus, the clock signal obtained by delaying by the cycle of 5T/8 the clock signal input into the delaying unit 103 (the fourth clock signal) can be output to the fourth driving unit 1104.

The output buffer 1332 outputs the clock signal output from the delay circuit 1402 to the seventh driving unit 1107. Thus, the clock signal obtained by delaying by the cycle of 3T/8 the clock signal input into the delaying unit 103 (the seventh clock signal) can be output to the seventh driving unit 1107.

The delay of the clock frequency delayed by the delaying unit 103 will be further described. The optical transmission apparatus 100 of the first embodiment is configured to produce the optical signals based on the quad-division multiplexing and for example, has a two-stage configuration having a second stage that includes the second and the third Mach-Zehnder modulators 212 and 213, disposed downstream the first Mach-Zehnder modulator 211. The second and the third Mach-Zehnder modulators 212 and 213 further divides respectively into the two light beams, the two light beams that are divided by the first Mach-Zehnder modulator 211, whereby, the optical transmission apparatus 100 divides the light beam input into the first Mach-Zehnder modulator 211 into the four light beams.

The optical transmission apparatus 100 can execute 2n-division multiplexing. "n" is a natural number of two or greater, and represents the number of stages. For a case of n stages, the delay amounts of the drive signals of the second and the third Mach-Zehnder modulators 212 and 213 can be expressed as values obtained by multiplying the cycle T by 1/2n, 3/2n, 5/2n, ..., (2n−1)/2n. As in the first embodiment, in the case of two stages, that is, the case for $2^2$(=4)-division, for example, the delay amount of one of the clock signals output from the delaying unit 103 to the second is T/4 and the third clock modulators 112 and 113 and the delay amount of the other clock signal is 3T/4.

The optical transmission apparatus 1100 of the fourth embodiment is configured to generate the optical signal based on octa-division multiplexing. For example, the optical transmission apparatus 1100 has a three-stage configuration in which the second stage that includes the second and the third Mach-Zehnder modulators 212 and 213, disposed downstream from the first Mach-Zehnder modulator 211 in the first stage; and has the fourth to the seventh Mach-Zehnder modulators 1114 to 1117 in the third stage disposed further downstream from the second stage Mach-Zehnder modulators.

As in the fourth embodiment, in the three-stage configuration, that is, the case for $2^3$(=8)-division, the delay of the fourth to the seventh Mach-Zehnder modulators 1114 to 1117 in the third stage each take any one of T/8, 3T/8, 5T/8, and 7T/8 values.

Not only the quad-division multiplexing and the octa-division multiplexing but also 16-division multiplexing and 32-division multiplexing can be executed. For example, in the case of the 16-division multiplexing, the optical transmission apparatus is configured to have eight Mach-Zehnder modulators in a fourth stage disposed further downstream from the four Mach-Zehnder modulators of the fourth to the seventh Mach-Zehnder modulators 1114 to 1117 described in the fourth embodiment. In the case of the four-stage configuration, that is, the case for $2^4$(=16)-division, the delay amounts of the clock modulators in the fourth stage are 1/16, 3/16, 5/16, ..., and 15/16. Similarly, in the case of 32 ($2^5$)-division multiplexing that employs a five-stage configuration, the delay amounts are 1/32, 3/32, 5/32, ..., and 31/32. In this manner, the division multiplexing can be executed according to the natural number n, which is two or greater.

As described, according to the optical transmission apparatus 1100 of the fourth embodiment, the fourth to the seventh clock signals are used that are respectively delayed by T/8, 3T/8, 5T/8, and 7T/8 with respect to the first clock signal. Thus, the condition of the interference is switched in each of the fourth to the seventh Mach-Zehnder modulators 1114 to 1117 during the time periods during which the optical clock pulses that are input into the fourth to the seventh Mach-Zehnder modulators 1114 to 1117 rise up.

Therefore, The optical clock pulses input into the fourth to the seventh Mach-Zehnder modulators 1114 to 1117 can each be further divided into two optical clock pulses. Therefore, a high speed optical signal based on the octa-division multiplexing can be generated even without the use of a high speed circuit in the data driving unit 120 or the first to the eighth data modulators 121 to 124 and 1125 to 1128.

A fifth embodiment of the optical transmission apparatus will be described. In the fifth embodiment, the timing at which the data driving unit 120 outputs the drive signal to the first to the fourth data modulators 121 to 124 is different from those of the first to the fourth embodiments. In the fifth embodiment, components will be described that differ from the first to the fourth embodiments.

FIG. 15 is a timing chart of an example of the operation of an optical transmission apparatus according to the fifth embodiment. The description will be made taking the output light beam 313 of the second Mach-Zehnder modulator 212 and the drive signal 321 of the first data modulator 121 as examples.

In the fifth embodiment, the optical transmission apparatus is designed such that the pulse portions of the output light beams 313 to 316 from the second and the third Mach-Zehnder modulators 212 and 213 do not overlap with the switching timings at which the values of the drive signals 321 to 324 are switched. For example, during the time period from the time when the data driving unit 120 switches the value of the drive signal 321 to the time when the value is switched to the next value, the output light beam 313 from the second Mach-Zehnder modulator 212 is switched from Low to High and is further switched from High to Low.

For example, the timing is set of the drive signal output by the data driving unit 120 to the first to the fourth data modulators 121 to 124 such that the pulse portions of the output light beams 313 to 316 do not overlap with the switching timings at which the values of the drive signals 321 to 324 are switched. Alternatively, a delaying unit to adjust the delay of the drive signals 321 to 324 is disposed between the data driving unit 120 and the first to the fourth data modulators 121 to 124 such that the pulse portions of the output light beams 313 to 316 do not overlap with the switching timings at which the values of the drive signals 321 to 324 are switched.

For example, in the example depicted in FIG. 15, the data driving unit 120 outputs to the first data modulator 121, the drive signal 321 having switching timings coinciding with the rising edge of the pulses of the drive signal 302 of the second driving unit 202. Thus, the pulse portions of the output light beam 313 from the second Mach-Zehnder modulator 212 and the switching timings at which the value of the drive signal 321 is switched can be set to prevent overlap with each other.

For example, a starting timing of one data section of the drive signal 321 can be set to be a point that is T/4 cycle before the timing at which the output light beam 313 is switched to be High, and an ending timing of one data section of the drive signal 321 can be set to be a point that is T/2 cycle after the timing at which the output light beam 314 is switched to be Low.

Therefore, for example, even when an error occurs in the timing of the drive signal 321 with respect to that of the output light beam 313, overlap of the High time period of the output light beam 313 and the switching timing of the drive signal 321 can be prevented and therefore, the modulation of the output light beam 313 can be stabilized. For the output light beams 314 to 316, similarly, overlap of the High time periods thereof and the switching timings of the drive signals 322 to 324 respectively can be prevented and therefore, the modulation of each of the output light beams 314 to 315 can be stabilized. Consequently, the signal quality of each of the output light beams 331 to 334 can be improved and the signal quality of the output light beam 340 can be improved.

As described, according to the fifth embodiment, the light beams are modulated using the drive signals whose switching timings to switch values the values thereof do not overlap with the pulse portions of the light beams to be modulated. Thus, the signal quality of the output light beam 340 can be improved.

A sixth embodiment of the optical transmission apparatus will be described. In the sixth embodiment, a case for tri-division multiplexing will be described. In the sixth embodiment, components will be described that differ from the first to the fifth embodiments.

FIG. 16A is a diagram of a configuration of the optical transmission apparatus according to the sixth embodiment. FIG. 16B is a diagram of an example of flows of light beams and electrical signals in the optical transmission apparatus depicted in FIG. 16A. As depicted in FIGS. 16A and 16B, the optical transmission apparatus 1600 according to the sixth embodiment is different from the optical transmission apparatus 100 depicted in FIGS. 2A and 2B in that the optical transmission apparatus 1600 does not include the third clock modulator 113 or the fourth data modulator 124.

The first clock modulator 111 outputs to the second clock modulator 112 and the third data modulator 123, the light beams obtained by the interference. The third data modulator 123 modulates the light beam output from the first clock modulator 111 using the drive signal output from the data driving unit 120. The third data modulator 123 outputs the optical signal obtained by the modulation to the optical coupler 153. The optical coupler 153 combines the optical signal output from the optical coupler 151 and the optical signal output from the third data modulator 123 and outputs the resulting optical signal.

FIG. 17 is a timing chart of an example of the operation of the optical transmission apparatus according to the sixth embodiment. In FIG. 17, components identical to those depicted in FIG. 3 will be given the same reference numerals used in FIG. 3, and will not again be described. In FIG. 17, the output light beam 333 is the light beam that is output to the optical coupler 153 by the third data modulator 123 according to the drive signal 323. For example, the output light beam 333 is the light beam obtained by modulating the High portions of the output light beam 312 using the value of "1" or "0" of the drive signal 323.

The output light beam 340 is the light beam obtained by combining the output light beams 331 to 333. The time period during which the output light beam 331 is High is T/4. The time period during which the output light beam 332 is High is T/4. The time period during which the output light beam 333 is High is T/2. Thus, these time periods are shifted with respect to each other. Therefore, the combining of the output light beams 331 to 333 with each other enables generation of a tri-division multiplexed optical signal whose cycle is T/4 or T/2.

The execution of the modulation for each of the divided output light beams 312 to 314 enables acquisition of the output light beam 340 whose value is switched at the cycle of T/4 or T/2 even when the cycle of each of the drive signals 321 to 323 is T. Therefore, for example, the operation cycle of each of the data driving unit 120 and the first to the third data modulators 121 to 123 can be set to be the cycle of T/4 or T/2.

In the sixth embodiment, the second Mach-Zehnder modulator 212 alone is disposed downstream from the first Mach-Zehnder modulator 211, and modulation is executed for each of the output light beams divided by the second Mach-Zehnder modulator 212 and the output light beam output from the first Mach-Zehnder modulator 211. Thus, the output light beam 340 can be obtained whose value is switched at the cycle of T/4 or T/2 even when the cycle of each of the drive signals 321 to 323 is T. Therefore, a high speed optical signal based on the tri-division multiplexing can be generated even without the use of a high speed circuit in the data driving unit 120 or the first to the third data modulators 121 to 123.

In the sixth embodiment, the drive signal 302 is set to be the signal that falls (or rises) during the time period during which the drive signal 301 rises, and the second Mach-Zehnder modulator 212 branches the light beam that is synchronized with the output light beam 311 and causes the resulting light beams to interfere with each other. However, configuration is not limited hereto. For example, the drive signal 302 may be set to be a signal that falls (or rises) during the time period during which the drive signal 301 falls, and the second Mach-Zehnder modulator 212 may branch the light beam that is inversely synchronized with the output light beam 312 and may cause the resulting light beams to interfere with each other. Even with this configuration, the output light beam 340 can be acquired whose value is switched at the cycle of T/4 or T/2.

According to an aspect of the embodiments, an effect is achieved that improvement of the transmission speed can be facilitated even without the use of a high speed electronic circuit.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus comprising:
  a generating unit that generates a first clock signal, a second clock signal of a cycle identical to that of the first clock signal and a phase different from that of the first clock signal, and a third clock signal of a phase different from that of the second clock signal by a 1/2 cycle;
  a first optical modulator that branches a light beam input thereto, changes a phase difference of resulting light beams according to the first clock signal, and causes interference of the light beams having the changed phase difference;

a second optical modulator that branches a light beam synchronized with the first clock signal among the light beams obtained from the first optical modulator, changes a phase difference of resulting light beams according to the second clock signal, and causes interference of the light beams having the changed phase difference;

a third optical modulator that branches a light beam inversely synchronized with the first clock signal among the light beams obtained from the first optical modulator, changes a phase difference of resulting light beams according to the third clock signal, and causes interference of the light beams having the changed phase difference;

an optical modulating unit that executes modulation based on the light beams obtained from the second optical modulator and the third optical modulator, respectively, and a drive signal input thereto; and an optical coupler that combines optical signals obtained by the modulation executed by the optical modulating unit.

2. The optical transmission apparatus according to claim 1, wherein the optical modulating unit executes the modulation using the drive signal for which a timing at which a value thereof switches is adjusted to be shifted from a pulse portion of the light beam subjected to the modulation.

3. An optical transmission apparatus comprising:

a generating unit that generates a first clock signal, a second clock signal of a cycle identical to that of the first clock signal and a phase different from that of the first clock signal, and a third clock signal of a phase identical to that of the second clock signal;

a first optical modulator that branches a light beam input thereto, changes a phase difference of resulting light beams according to the first clock signal, and causes interference of the light beams having the changed phase difference;

a second optical modulator that branches a light beam synchronized with the first clock signal among the light beams obtained from the first optical modulator, changes a phase difference of resulting light beams according to the second clock signal, and causes interference of the light beams having the changed phase difference;

a third optical modulator that branches a light beam inversely synchronized with the first clock signal among the light beams obtained from the first optical modulator, changes a phase difference of resulting light beams according to the third clock signal, and causes interference of the light beams having the changed phase difference;

an optical modulating unit that executes modulation based on the light beams obtained from the second optical modulator and the third optical modulator, respectively, and a drive signal input thereto; and an optical coupler that combines optical signals obtained by the modulation executed by the optical modulating unit.

4. An optical transmission apparatus comprising:

a generating unit that generates a first clock signal, a second clock signal of a frequency twice that of the first clock signal, and a third clock signal of a phase different from that of the second clock signal by a 1/2 cycle;

a first optical modulator that branches a light beam input thereto, changes a phase difference of resulting light beams according to the first clock signal, and causes interference of the light beams having the changed phase difference;

a second optical modulator that branches a light beam synchronized with the first clock signal among the light beams obtained from the first optical modulator, changes a phase difference of resulting light beams according to the second clock signal, and causes interference of the light beams having the changed phase difference;

a third optical modulator that branches a light beam inversely synchronized with the first clock signal among the light beams obtained from the first optical modulator, changes a phase difference of resulting light beams according to the third clock signal, and causes interference of the light beams having the changed phase difference;

an optical modulating unit that executes modulation based on the light beams obtained from the second optical modulator and the third optical modulator, respectively, and a drive signal input thereto; and an optical coupler that combines optical signals obtained by the modulation executed by the optical modulating unit.

5. An optical transmission apparatus comprising:

a generating unit that generates a first clock signal, a second clock signal of a cycle identical to that of the first clock signal and a phase different from that of the first clock signal, a third clock signal of a phase different from that of the second clock signal by a 1/2 cycle, a fourth clock signal of a cycle identical to that of the second clock signal and a phase different from that of the second clock signal, a fifth clock signal of a phase different from that of the fourth clock signal by a 1/4 cycle, a sixth clock signal of a cycle identical to that of the third clock signal and a phase different from that of the third clock signal, and a seventh clock signal of a phase different from that of the sixth clock signal by a 1/4 cycle;

a first optical modulator that branches a light beam input thereto, changes a phase difference of resulting light beams according to the first clock signal, and causes interference of the light beams having the changed phase differences;

a second optical modulator that branches a light beam synchronized with the first clock signal among the light beams obtained from the first optical modulator, changes a phase difference of resulting light beams according to the second clock signal, and causes interference of the light beams having the controlled phase difference;

a third optical modulator that branches a light beam inversely synchronized with the first clock signal among the light beams obtained from the first optical modulator, changes a phase difference of resulting light beams according to the third clock signal, and causes interference of the light beams having the changed phase difference;

a fourth optical modulator that branches one of the light beams obtained from the second optical modulator, changes a phase difference of resulting light beams according to the fourth clock signal, and causes interference of the light beams having the changed phase difference;

a fifth optical modulator that branches another of the light beams obtained from the second optical modulator, changes a phase difference of resulting light beams according to the fifth clock signal, and causes interference of the light beams having the changed phase difference;

a sixth optical modulator that branches one of the light beams obtained from the third optical modulator, changes a phase difference of resulting light beams according to the sixth clock signal, and causes interference of the light beams having the changed phase difference;

a seventh optical modulator that branches another of the light beams obtained from the third optical modulator, changes a phase difference of resulting light beams according to the seventh clock signal, and causes interference of the light beams having the changed phase difference;

an optical modulating unit that executes modulation based on the light beams obtained from the fourth optical modulator, the fifth optical modulator, the sixth optical modulator, and the seventh optical modulator, respectively, and a drive signal input thereto; and an optical coupler that combines optical signals obtained by the modulation by the optical modulating unit.

6. An optical transmission apparatus comprising:

a generating unit that generates a first clock signal, a second clock signal of a frequency half that of the first clock signal, and a third clock signal of a phase different from that of the second clock signal by a 1/2 cycle;

a first optical modulator that branches a light beam input thereto, changes a phase difference of resulting light beams according to the first clock signal, and causes interference of the light beams having the changed phase difference;

a second optical modulator that branches a light beam synchronized with the first clock signal among the light beams obtained from the first optical modulator, changes a phase difference of resulting light beams according to the second clock signal, and causes interference of the light beams having the changed phase difference;

a third optical modulator that branches a light beam inversely synchronized with the first clock signal among the light beams obtained from the first optical modulator, changes a phase difference of resulting light beams according to the third clock signal, and causes interference of the light beams having the changed phase difference;

an optical modulating unit that executes modulation based on the light beams obtained from the second optical modulator and the third optical modulator, respectively, and a drive signal input thereto; and an optical coupler that combines optical signals obtained by the modulation executed by the optical modulating unit.

7. An optical transmission apparatus comprising:

a generating unit that generates a first clock signal and a second clock signal of a cycle identical to that of the first clock signal and a phase different from that of the first clock signal;

a first optical modulator that branches a light beam input thereto, changes a phase difference of resulting light beams according to the first clock signal, and causes interference of the light beams having the changed phase difference;

a second optical modulator that branches a light beam synchronized with the first clock signal among the light beams obtained from the first optical modulator, changes a phase difference of resulting light beams according to the second clock signal, and causes interference of the light beams having the changed phase difference;

an optical modulating unit that executes modulation based on a light beam inversely synchronized with the first clock signal and among the light beams obtained from the first optical modulator, the light beams obtained from the second optical modulator, and a drive signal input thereto; and an optical coupler that combines optical signals obtained by the modulation by the optical modulating unit.

* * * * *